US011902771B2

(12) United States Patent
Brodersen et al.

(10) Patent No.: US 11,902,771 B2
(45) Date of Patent: Feb. 13, 2024

(54) AUDIO SPACE SIMULATION IN A LOCALIZED AUDIO ENVIRONMENT

(71) Applicant: SPATIALX INC., Scottsdale, AZ (US)

(72) Inventors: Rainer Brodersen, San Clemente, CA (US); Michael Plitkins, Piedmont, CA (US); Calin Pacurariu, Cave Creek, AZ (US); Xavier Prospero, San Francisco, CA (US); Robert Aric Marshall, San Jose, CA (US); Kristin Miltner, Vallejo, CA (US); Kenneth P. Felton, Belmont, CA (US); Kenneth Pearce, San Francisco, CA (US)

(73) Assignee: SPATIALX INC., Scottsdale, AZ (US)

( * ) Notice: Subject to any disclaimer, the term of this patent is extended or adjusted under 35 U.S.C. 154(b) by 51 days.

(21) Appl. No.: 17/646,091

(22) Filed: Dec. 27, 2021

(65) Prior Publication Data

US 2023/0209294 A1 Jun. 29, 2023

(51) Int. Cl.
*H04S 7/00* (2006.01)

(52) U.S. Cl.
CPC .......... *H04S 7/303* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 2013/0041648 A1* | 2/2013 | Osman | H04S 7/302 | 381/300 |
| 2016/0021476 A1* | 1/2016 | Robinson | H04R 5/02 | 381/303 |
| 2021/0204087 A1* | 7/2021 | Lyren | G06F 3/011 | |
| 2022/0014868 A1* | 1/2022 | Binn | H04R 3/12 | |
| 2022/0030370 A1* | 1/2022 | Cartwright | H04R 5/04 | |

* cited by examiner

*Primary Examiner* — Qin Zhu
(74) *Attorney, Agent, or Firm* — Maschoff Brennan

(57) ABSTRACT

According to some embodiments, operations may include obtaining a virtual space that includes a virtual speaker distribution of virtual speakers within the virtual space. The operations may further include obtaining an audio file that includes audio corresponding to an audio object of an audio scene and generating one or more audio signals based on the virtual speaker distribution and the audio file. In these or other embodiments, the operations may include mapping each respective virtual speaker to a respective point source in an audio localization environment that corresponds to the virtual space. In addition, the operations may include providing the one or more audio signals to an audio localization system according to the mapping of the virtual speakers to their respective point sources.

20 Claims, 13 Drawing Sheets

AUDIO SPACE SIMULATION IN A LOCALIZED AUDIO ENVIRONMENT

FIELD

The embodiments discussed herein are related to integration of audio space simulation in a localized audio environment.

BACKGROUND

Many environments are augmented with audio systems. For example, hospitality locations including restaurants, sports bars, and hotels often include audio systems. Additionally locations including small to large venues, retail, temporary event locations, and residences, may also include audio systems. The audio systems may play audio in the environment to create or add to an ambiance.

The acoustics of audio presented by different audio systems may vary based on a size of the space in which the audio is presented, speaker types and/or placement in the space, objects within the space, types of materials included in the space, etc. Such variations may make it difficult to asses how audio presented in a particular space according to a certain configuration may be perceived without actually implementing the configuration within the space.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to some embodiments, operations may include obtaining a virtual space that includes a virtual speaker distribution of virtual speakers within the virtual space. The virtual space may represent a physical environment. The operations may further include obtaining an audio file that includes audio corresponding to an audio object of an audio scene and generating one or more audio signals based on the virtual speaker distribution and the audio file. The generating may be such that presentation of the one or more audio signals by speakers within the physical environment represented by the virtual speakers produces the audio in a manner that simulates the audio object in the physical environment. In these or other embodiments, the operations may include mapping each respective virtual speaker to a respective point source in an audio localization environment that corresponds to the virtual space. In addition, the operations may include providing the one or more audio signals to an audio localization system according to the mapping of the virtual speakers to their respective point sources. The audio localization system may be configured to, based on the one or more audio signals corresponding to respective point sources according to the mapping, synthesize a binaural sound for playback by a set of stereo speakers such that the audio is simulated as being presented by speakers within the physical environment that are represented by the virtual speakers.

The objects and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings.

DESCRIPTION OF EMBODIMENTS

Figure 1A:
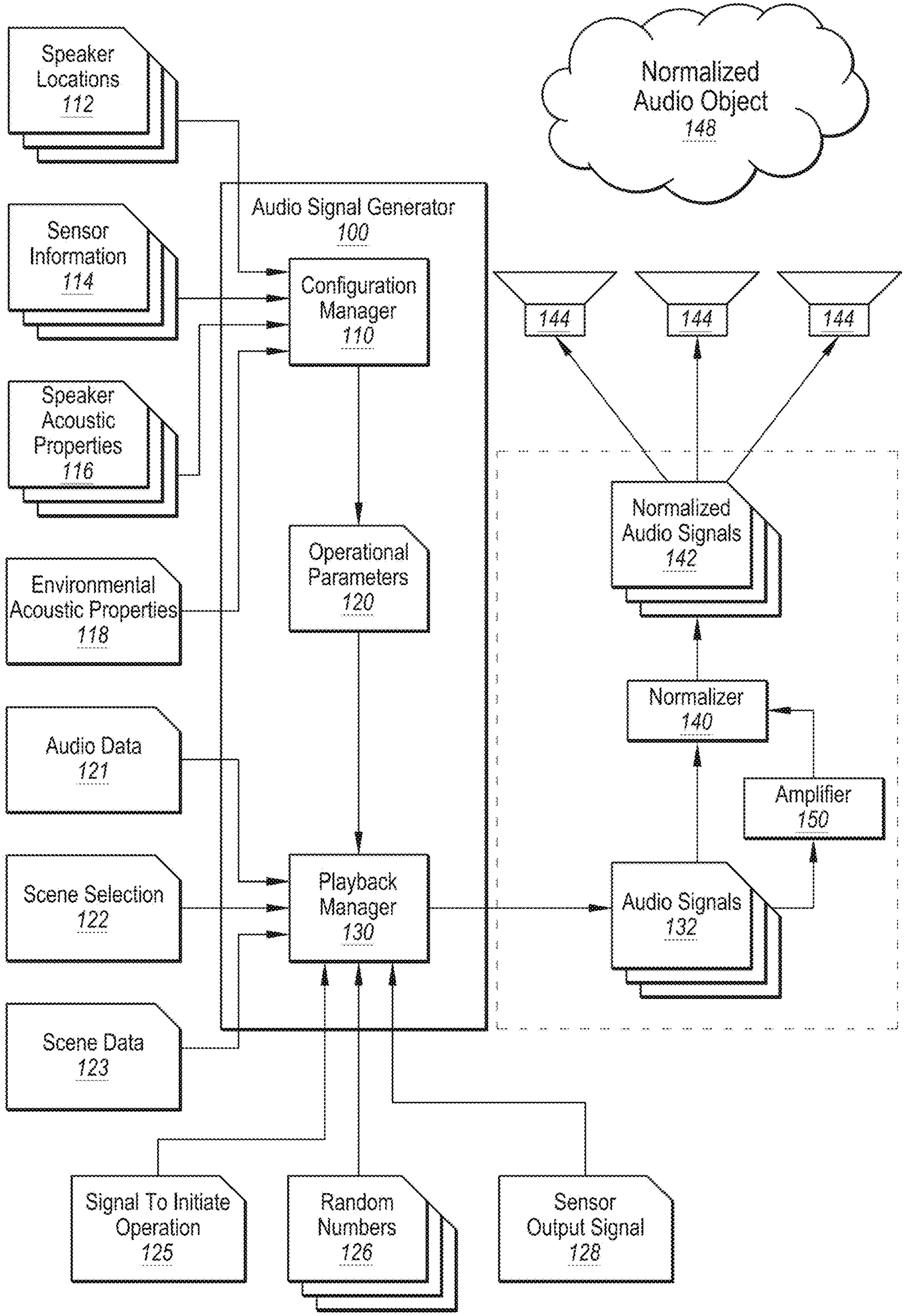
FIG. 1A is a block diagram of an example audio signal generator configured to generate audio signals for an audio system in an environment.

According to some embodiments of the present disclosure, an audio system may be configured to use multiple speakers to generate an audio experience. For example, the audio system may cause speakers to output sound waves that are mixed together in time, amplitude and frequencies to produce an overall volume of sound where virtual audio objects can be located and moved within a space (e.g., a virtual space). In these or other embodiments, the audio system may be configured to dynamically mix audio samples from audio data to generate different audio signals that may be provided to different speakers in the environment in a dynamic manner such that audio emitted by the speakers renders a single audio object.

In these or other embodiments, the different audio signals may be generated to provide a "3D" audio experience, without relying on a specific predetermined positioning of speakers that may project the audio based on the audio signals. Further, aspects of the present disclosure may include an adjustment of the audio signals provided to one or more speakers based on various factors, including but not limited to: sound quality of an audio object across a plurality of speakers to produce the audio object in a defined location in the environment; speaker density having too many speakers in a region of the environment; speaker density having too few speakers in a region of the environment; regular or irregular speaker counts and placement; flexible or inflexible speaker counts and placement; consistent audio object representation for audio behaviors of the audio object; having a single version of audio content for one or more audio objects developed for a plurality of environments and audio systems; ability of audio systems to represent audio object in a specific environment; or combinations thereof.

In these or other embodiments, the audio system in an environment may be configured to present an audio object in a particular location or movement trajectory/path by adjusting of the audio signals provided to at least one speaker in such a manner that provides volume smoothness and consistency for the audio object without the audio object volume spiking or dropping out in a particular location or region in the environment. The adjustment of the one or more audio speakers for enhanced audio object representation can be performed by a normalization procedure that normalizes the one or more audio signals (e.g., often two or more) to the corresponding one or more speakers (e.g., often two or more), which may result in a more consistent and smoother sound of the audio object in a dynamic environment. A modulation of the audio signals can result in the audio system representing the audio object across multiple speakers so that the audio object is clear and consistent in quality and volume in a specific position in the environment or as the audio object moves within the environment.

The modulation of the audio signals can compensate for too many speakers in certain regions of the environment or for too few speakers in certain other areas of the environment. The modulation can be configured to optimize the sound for regions that may have a sparse sound density (e.g., not enough speaker coverage) or a dense sound density (e.g., too much overlap in speaker coverage). In instances in which there is not enough coverage, the audio system can modulate the audio signals to determine a volume for the rendered audio object that can be achieved by the speakers. For example, the volume emitted by one or more speakers can be cooperatively tuned so that the audio object is rendered with a volume that is smooth and consistent without spiking or dropping out. The cooperative tuning provides a specific audio signal (e.g., normalized) for each speaker so that cooperatively the volume is at the desired level and so that no speaker overcompensates and blares out high volume spiked sounds.

As used herein a sound volume "spike" is when the volume is being emitted at a certain volume, and then there is a drastic volume increase in a short time frame. For example, a chittering squirrel can be an audio object that can be heard by an observer, where the volume is fairly smooth and consistent, then suddenly within less than a second, half second, or quarter second, the volume of the chittering squirrel increases to a maximum level that is significantly higher (e.g., 1.5×, 2×, 3×, 5×, 10×, 100×, etc.), which can be maintained high or drop back down. Volume spikes often make a sound feel artificial because it does not present as the object normally sounds. Sounds may increase in volume, but not at a rapid and artificial rate that "spikes" to a much louder sound.

As used herein, a sound volume "dropout" or "drop off" is when the volume is being emitted at a certain volume, and then there is a drastic volume decrease in a short time frame. A dropout is basically the opposite of a spike. This makes if feel like an audio object disappears, which can cause an artificial ambiance experience. For example, a chittering squirrel can be an audio object that can be heard by an observer, where the volume is fairly smooth and consistent, then suddenly within less than a second, half second, or quarter second, the volume of the chittering squirrel vanishes or drops to a significantly lower (e.g., 50%, 25%, 10%, 5%, 1%, etc.), which can be maintained low or rise back up. Volume dropouts often make a sound feel artificial because it does not present as the object normally sounds, and because objects usually do not disappear. Sounds may decrease in volume, but not at a rapid and artificial rate that "drops off" to a much quieter sound or no sound at all.

The audio signals may be generated by an audio signal generator, such as described herein. The audio signal generator may have a playback manager configured to provide for the audio object to be presented whether in regular (e.g., even or homogeneous distribution) or irregular (e.g., uneven or inhomogeneous distribution) speaker counts and placements or flexible (e.g., speakers can move) or inflexible (e.g., speaker fixed or integrated) speaker placements. The playback manager may be configured to provide the audio signals to improve more consistent audio object representation for different audio object behaviors, such as a stationary audio object (e.g., mouse stationary), moving audio object (e.g., mouse scurrying across floor), or reactive audio object (e.g., mouse shrieks and/or moves once a person comes into a vicinity of the virtual audio object mouse).

The playback manager can receive the audio data that is substantially consistent (e.g., single version for use in highly variant installations or physical locations) in view of the operational parameters of the specific audio system for the specific environment. Then, the playback manager can provide the appropriate audio signals to a normalizer so that the audio signals can be modulated in accordance with the specific requirements so that the audio object can be presented with consistent audio behavior. This allows for a single version of the content to be provided and deployed across different types of audio systems with different speaker placements in order to achieve the same or similar audio object and experience from the audio object, whether stationary or dynamic. The playback manager may also perform the normalization and may be considered to be a normalizer. However, this normalization function may be distributed across various modules or a different module other than the playback manager. For example, the audio signals can be provided through one or more amplifiers that then are processed with the normalizer before being passed to the different speakers in the audio system. In any event, the audio system can normalize the audio signals so that a set of speakers can accurately render an audio object at a defined location with smooth and consistent volume.

The operational parameters provided to the playback manager can be sourced from a configuration manager. As such, a configuration manager can have information about the speaker locations and general audio profiles for the audio system and environment from the speakers. The configuration manager can either receive or store an audio heatmap that shows the density of audio potential (e.g., audio density, volume density, audio potential density, etc.), where areas in the audio heatmap nearer to one or more speakers may show increased audio density and areas further from one or more speakers can show reduced audio density. This audio heatmap can then be used to modulate the distribution of the speakers in the environment or to modulate the operational parameters provided to the playback manager, or provide modulation information to the playback manager so that the audio signals can be modulated, such as modulated by the normalization protocol. The audio heatmap can be specific to a specific installation in an environment with defined speaker placement and counts. Each specific installation can have its own audio heatmap for use in normalizing the audio signals to provide for the improved rendering of an audio object, whether stationary or dynamic.

The audio system can be configured to generate normalized audio signals in order to provide an audio experience that may change over time in a non-repetitive manner, or with the condition of the environment; which may provide for a more interactive audio experience as compared to those provided by other techniques of generating audio. The normalized audio signals can result in a better rendered audio object especially when the audio object moves and sounds to be moving through the space of the environment. The improved rendering can be obtained by the appropriate speakers receiving the normalized audio signals and emitting normalized sound for representing the audio object in discrete positions in real time in a dynamic movement.

Systems and methods related to generating dynamic audio in an environment are disclosed in the present disclosure. Generating audio in the environment may be accomplished by providing audio at a speaker in the environment based on an audio signal. Generating the audio signal may be accomplished, for example, by composing audio data into the audio signal. The audio data may include recorded or synthesized sounds. For example the audio data may include sounds of music, birds chirping, or waves crashing, or any other natural sounds of an environment (e.g., beach). A particular audio signal may include different audio data to be played simultaneously or nearly simultaneously. For example, a particular audio signal may include the sounds of birds chirping, animals moving between locations, and waves crashing, all to be played around the same time or at overlapping times. However, speaker density or audio potential distributions (e.g., see audio heatmap) may have difficulty accurately rendering such a beach scene, and speaker overcompensation can cause sound spikes or undercompensation can cause sound dropouts. The audio signals for rendering the one or more audio objects can then be normalized so that there are not any speakers with volume spikes or dropouts for a particularly rendered audio object at any specific moment in time. In real time, the audio signals can be normalized for the set of speakers to maintain the smoothness and consistency in the audio experience. The normalized audio signals result in consistency and smoothness of the resulting audio sound with reduced volume spikes or dropouts of the sounds.

In the present disclosure, providing audio at a speaker may be referred to as playing audio, audio playback, or generating audio. Also, providing audio at a speaker based on an audio signal may be referred to as playing the audio signal. Also, reference to playing the audio data of an audio signal, or playing the sound of the audio data may refer to providing audio at a speaker in which the audio is based on the audio data. The audio data or audio signal may be normalized between one or more speakers, especially across a plurality of speakers for providing audio for or rendering one or more audio objects.

Dynamic audio may include audio provided by one or more speakers that changes over time or in response to a condition of the environment. The dynamic audio may be generated by changing the composition of audio data in one or more of the audio signals by normalizing the audio signals that are received by the respective speakers so that the audio object has a smooth and consistent sound without volume spikes or dropouts. For an example of dynamic audio, an audio signal may be generated for a speaker in the environment and then normalized to optimize the sound of the audio object. The audio signal may initially include audio data of music. The composition of the audio signal may be changed to also include audio data of a bird chirping. When the speaker provides the audio from the audio signal of music, and when the audio signal changes to include the sound of the bird, the speaker may also provide the sound of the bird chirping in addition to the music such that the audio provided by the speaker may be dynamic. The normalizer can normalize each audio signal so that the respective audio object sounds smooth and consistent without volume spikes or dropouts, especially if the audio object (e.g., bird) sounds like it is in the environment with (e.g., with the music) or moving from one location to another (e.g., wings flapping while flying) in the environment.

In some embodiments, the audio system may include multiple speakers distributed throughout the environment. Each of the speakers may receive a different normalized audio signal which may result in each of the speakers providing different audio in order to accurately render the audio object at a specific location in real time. For example, in an audio system including several speakers, at least one speaker of the several speakers may play sounds of a bird chirping. The at least one speaker playing the sounds of a bird chirping may give a person in the environment the impression that a bird is chirping in a specific location, independent of speaker location. The speakers may make sound waves that are synchronized together in time, amplitude and frequencies to produce an overall volume of sound where virtual audio objects can be located and moved within a space consistently and smoothly without volume spikes or dropout. For example, sound waves may be generated such that related sound waves arrive at a predetermined location at substantially the same time, or at the same time without a volume spike or dropout. For example, audio signals may be generated and normalized such that when they are output by two speakers at two different locations, the sound generated by the speakers arrives at one or more points in the environment at or near the same time without a volume spike or dropout.

According to one or more embodiments of the present disclosure, audio systems of the present disclosure may accordingly be configured to generate audio scenes that include multiple audio objects to provide a particular type of user experience. Such audio scenes may include any compilation of audio that may be associated with a type of experience, location, etc.

In these or other embodiments, an audio scene that may be generated by an audio system of the present disclosure with respect to a particular physical environment may be simulated outside of such physical environment such that the audio scene as presented within the physical environment may be sampled outside of such physical environment. The ability to simulate audio scenes outside of the physical space in which the scene may be implemented may allow for better decision making regarding configuration of speakers (e.g., speaker placement, number of speakers, types of speakers, etc.) in the physical space before placing actual speakers within the physical space. Additionally or alternatively, the ability to simulate audio scenes outside of the physical space in which the scene may be implemented may allow for scene configuration and modifications for a particular physical space by those who may not be able to be within the actual physical space. In these or other embodiments, such ability may allow for better decision making regarding which types of scenes may be implemented in certain physical spaces. As described in further detail below, in some embodiments, an audio localization environment may be integrated with the audio system to simulate audio scenes as discussed above.

FIG. 1 is a block diagram of an example audio signal generator 100 configured to generate audio signals 132 for an audio system in an environment arranged in accordance with at least one embodiment described in this disclosure. In general, the audio signal generator 100 generates audio signals 132 for speakers 144 in an environment based on one or more of: speaker locations 112, sensor information 114, speaker acoustic properties 116, environmental acoustic properties 118, audio data 121, a scene selection 122, scene data 123, a signal to initiate operation 125, random numbers 126, or a sensor output signal 128. Additionally or alternatively, the audio signals 132 may be normalized with a normalizer 140 in order to produce normalized audio signals 142. The normalized audio signals 142 are then passed to the appropriate speakers 144 in order to present a normalized audio object 148 at the object location more consistently and smoothly to reduce or eliminate a volume spike or dropout. In these or other embodiments, the audio signals 132 and/or the normalized audio signals 142 may correspond to an audio scene that includes one or more audio objects (e.g., one or more normalized or not normalized audio objects) such that the speakers may collectively present the audio scene according to received audio signals 132 and/or normalized audio signals 142.

The audio signal generator 100 may include code and routines configured to enable a computing system to perform one or more operations to generate audio signals 132 that are then normalized into normalized audio signals 142 with the normalizer 140. The audio signals 132 may be analog or digital. In at least some embodiments, the audio signal generator 100 may include a balanced and/or an unbalanced analog connection to an external amplifier (e.g., 150), such as in embodiments where one or more speakers 144 do not include an embedded or integrated processor. The external amplifier 150 may provide amplified audio signals to the normalizer 140. The normalizer 140 and/or amplifier 150 may be considered to be part of the audio signal generator 100 as shown by the dashed line box, but may be individual components or grouped together.

Additionally or alternatively, the audio signal generator 100 may be implemented using hardware including a processor, a microprocessor (e.g., to perform or control performance of one or more operations), a field-programmable gate array (FPGA), a digital signal processor (DSP), or an application-specific integrated circuit (ASIC). In some other instances, the audio signal generator 100 may be implemented using a combination of hardware and software. In the present disclosure, operations described as being performed by the audio signal generator 100 may include operations that the audio signal generator 100 may direct a system to perform. The audio signal generator 100 may include more than one processor that can be distributed among multiple speakers or centrally located, such as in a rack mount system that may connect to a multi-channel amplifier.

In some embodiments, the audio signal generator 100 may include a configuration manager 110 which may include code and routines configured to enable a computing system to perform one or more operations to configure speakers 144 of an audio system for operation in an environment. Additionally or alternatively, the configuration manager 110 may be implemented using hardware including a processor, a microprocessor (e.g., to perform or control performance of one or more operations), an FPGA, or an ASIC. In some other instances, the configuration manager 110 may be implemented using a combination of hardware and software. In the present disclosure, operations described as being performed by the configuration manager 110 may include operations that the configuration manager 110 may direct a system to perform.

In general the configuration manager 110 may be configured to generate operational parameters 120 that may include information that may cause an adjustment in the way audio is generated and/or adjusted. In an example, the configuration manager 110 can use an audio heatmap for the speakers 144 in the installation. In another example, the normalizer 140 may be part of the configuration manager 110 or provide normalization data thereto. In these or other embodiments, the configuration manager 110 may be configured to generate the operational parameters 120 based on the speaker locations 112, the sensor information 114, the speaker acoustic properties 116, the environmental acoustic properties 118, room geometry, and other information.

For example, the configuration manager 110 may sample a room to determine a location of walls, ceiling(s), and floor(s) or have the data input therein. The configuration manager 110 may also determine locations and orientations of speakers 144 that have been placed in the room or have the data input therein. Accordingly, the configuration manager 110 can generate the audio heatmap from the operational parameters 120, which is described in more detail herein, or the audio heatmap can be generated by data input therein.

The speaker locations 112 may include location information of one or more speakers 144 in an environment. The speaker locations 112 may include relative location data, such as, for example, location information that relates the position/orientation of speakers 144 to other speakers 144, walls, or other features in the environment. Additionally or alternatively the speaker locations 112 may include location information relating the location of the speakers 144 to another point of reference, such as, for example, the earth, using, for example, latitude and longitude. The speaker locations 112 may also include orientation data of the speakers 144. The speakers 144 may be located anywhere in an environment. In at least some embodiments, the speakers 144 can be arranged in a space with the intent to create particular kinds of audio immersion. Example configurations for different audio immersion may include ceiling mounted speakers 144 to create an overhead sound experience, wall mounted speakers 144 for a wall of sound, a speaker distribution around the wall/ceiling area of a space to create a complete volume of sound. If there is a subfloor under the floor where people may walk, speakers 144 may also be mounted to or within the subfloor. The audio heatmap may be generated at least in part by the data of the speaker locations, such as the audio heatmap index having higher density sound at the speaker. The projection of sound from the speaker at the location can provide information for the audio potential of the audio system, which can then be used for generating the audio heatmap.

The sensor information 114 may include location information of one or more sensors in an audio system. The location information of the sensor information 114 may be the same as or similar to the location information of the speaker locations 112. Further, the sensor information 114 may include information regarding the type of sensors, for example the sensor information 114 may include information indicating that the sensors of the audio system include a sound sensor, and a light sensor. Additionally or alternatively the sensor information 114 may include information regarding the sensitivity, range, and/or detection capabilities of the sensors of the audio system. The sensor information 114 may also include information about an environment or room in which the audio signal generator 100 may be located. For example, the sensor information 114 may include information pertaining to wall locations, ceiling locations, floor locations, and locations of various objects within the room (such as tables, chairs, plants, etc.). In at least some embodiments, a single sensor device may be capable of sensing any or all of the sensor information 114.

The speaker acoustic properties 116 may include information about one or more speakers 144 of the audio system, such as, for example, a size, a wattage, and/or a frequency response of the speakers 144 as well as a frequency dispersion pattern therefrom. The speaker acoustic properties 116 can be used in generating the audio heatmap. As such, the location/orientation data (e.g., 112) and the speaker acoustic property data (116) can be used for determining the audio heatmap, where each speaker acoustic property 116 can be correlated with the speaker locations 112.

The environmental acoustic properties 118 may include information about sound or the way sound may propagate in the environment. The environmental acoustic properties 118 may include information about sources of sound from outside environment, such as, for example, a part of the environment that is open to the outside, or a street or a sidewalk. The environmental acoustic properties 118 may include information about sources of sound within the environment, such as, for example, a fountain, a fan, or a kitchen that frequently includes sounds of cooking. Additionally or alternatively environmental acoustic properties 118 may include information about the way sound propagates in the environment, such as, for example, information about areas of the environment including walls, tiles, carpet, marble, and/or high ceilings. The environmental acoustic properties 118 may include a map of the environment with different properties relating to different sections of the map, which map may be the audio heatmap or included in the audio heatmap. The environmental acoustic properties 118 can be used in generating the audio heatmap. For example, the environmental acoustic properties 118 may impact the sound potential of a certain region, such as by sound reflection causing a change in the sound potential. The audio heatmap may modify the sound density based on such reflection or other change to sound caused by an environment (e.g., sound absorption).

The operational parameters 120 may include factors that may affect the way audio generated by the audio system is propagated in the environment. Additionally or alternatively the operational parameters 120 may include factors that may affect the way that audio generated by the audio system is perceived by a listener in the environment. As such, in some embodiments, the operational parameters 120 may be based on or include, the speaker locations 112, the sensor information 114, the speaker acoustic properties 116, and/or the environmental acoustic properties 118.

Additionally or alternatively, the operational parameters 120 may be based on the speaker locations 112, the sensor information 114, the speaker acoustic properties 116, and/or the environmental acoustic properties 118 as well as the audio heatmap. For example, the relative positions of the speakers 144 with respect to each other as indicated by the speaker locations 112 may indicate how the individual sound waves of the audio projected by the individual speakers 144 may interact with each other and propagate in the environment. Additionally or alternatively, the speaker acoustic properties 116 and the environmental acoustic properties 118 may also indicate how the individual sound waves of the audio projected by the individual speakers 144 may interact with each other and propagate in the environment. Similarly, the sensor information 114 may indicate conditions within the environment (e.g. presence of people, objects, etc.) that may affect the way the sound waves may interact with each other and propagate throughout the environment. As such, in some embodiments, the operational parameters 120 may include the interactions of the sound waves that may be determined. In these or other embodiments, the interactions included in the operational parameters may include timing information (e.g., the amount of time it takes for sound to propagate from a speaker 144 to a location in the environment such as to another speaker in the environment), echoing or dampening information, constructive or destructive interference of sound waves, or the like. As a result, normalization may occur at the configuration manager 110 or provided to the configuration manager 110. Thereby, the heatmap may be used by the configuration manager 110 to provide the operational parameters.

Because the operational parameters 120 may include factors that affect the way audio emitted by the audio system is propagated in the environment, the audio signal generator 100 may be configured to generate and/or adjust the audio signals based on the operational parameters 120, with or without normalization. The audio signal generator 100 may be configured to adjust one or more settings related to generation or adjustment of audio; for example, one or more of a volume level, a frequency content, dynamics, a playback speed, a playback duration, and/or distance or time delay between speakers of the environment.

There may be unique operational parameters 120 for one or more speakers 144 of the audio system. In some embodiments, there may be unique operational parameters 120 for each speaker 144 of the audio system. The unique operational parameters 120 for each speaker 144 may be based on the unique location information of each of the speakers 144 represented in the speaker locations 112 and/or the unique speaker acoustic properties 116.

Because the operational parameters 120 may be based on the speaker locations 112 and acoustic properties 115, the operational parameters 120 may enable the generation and/or adjustment of audio signals 132 specifically for the positions of the speakers 144 in the environment. Because the generation and/or adjustment of audio signals 132, may be based on the position of the speakers 144, the speakers 144 may be distributed irregularly through the environment. It may be that there is no set positioning or configuration of speakers 144 required for operation of the audio system. It may be that the speakers 144 can be distributed regularly or irregularly throughout the environment. Accordingly, normalization of the audio data can provide for normalized audio data so that an audio object can be accurately represented by the speakers 144 as described herein.

Additionally or alternatively, because the operational parameters 120 may be based on the environmental acoustic properties 118, the operational parameters 120 may enable the generation and/or adjustment of audio signals 132 specifically for the environment. For example, the operational parameters 120 may indicate that a higher volume level may be better for a particular speaker near to the street in the environment. For another example, the operational parameters 120 may indicate that a quiet volume level may be better for a particular speaker 144 in an area of the environment that may cause sound to echo. For another example, a damping of a particular frequency may be better for a particular speaker 144 in a portion of the environment that would cause the particular frequency to echo.

In some embodiments, the normalizer 140 can be part of the configuration manager 110 so that the normalization is performed to normalize the operational parameters. As such, the protocols for normalizing the audio signals 132 may instead be applied to the data at the configuration manager 110 so that the operational parameters can provide data for the normalized audio. For example, the foregoing properties that allow for determination of the operational parameters 120 may also be used for normalizing so that the operational parameters 120 already include the normalized audio data. This allows for a high level normalization based on the information that is provide to the configuration manager 110. The configuration manager 110, thereby may be useful to perform the normalization procedure and may be considered to be a normalizer 140. When the configuration manager 110 is also a normalizer, the illustrated normalizer downstream from the playback manager 130 may be omitted, and thereby the audio signals 132 provided by the playback manager 130 may indeed already be normalized audio signals 142.

As an example of the way the audio signals 132 may be generated based on the operational parameters 120, the audio signal generator 100 may generate audio signals 132 simulating a fire truck with a blaring siren driving past an environment on one side of the environment. To simulate the fire truck the audio signal generator 100 may generate audio signals 132 including audio data of the siren for only speakers 144 on the one side of the environment. The audio object for the fire truck can be presented to sound like the fire truck is moving in the environment. Accordingly, the audio signals 132 of the fire truck may be normalized so that the sound presents as a familiar sound of a fire truck as is moves from one location to another, where the normalization can smoothen the sound of the siren to avoid volume spikes or dropout in different regions with different speaker densities. The operational parameters 120 may include speaker locations 112, thus, the audio signal generator 100 may use the operational parameters 120 to determine which audio signals 132 may include audio data of the siren for normalization purposes. Additionally or alternatively, the audio signal generator 100 may determine the volume of the audio signals 132 based on the operational parameters 120 such that the volume is the loudest at speakers 144 on the one side of the environment. During movement of the audio object of the fire truck, the normalized audio signals 142 provide for smooth consistent movement of the audio object without volume spikes or dropout as different speakers 144 change their emission for rendering the audio object as it moves through the audio potential zones of different speakers 144.

Further, to simulate the fire truck driving past the environment, the audio signal generator 100 may generate audio signals 132 including audio data of the siren at different speakers 144 at different times, or sequentially. The operational parameters 120 may include speaker locations 112, thus, the audio signal generator 100 may use the operational parameters 120 to determine the order in which the various audio signals 132 will include the audio data of the siren.

The normalization results in normalized audio signals that cause the speakers 144 to emit a continuous sound as the audio object moves across the environment. To simulate the speed at which the fire truck drives past the environment, audio signal generator 100 may generate audio signals 132 including audio data of the siren for certain durations of time at the various speakers 144. The operational parameters 120 may include speaker locations 112 which may include separation between speakers 144, thus, the operational parameters 120 may be used to determine the duration for which each of the various audio signals 132 will include the audio data of the siren. For example, the separation between speakers 144 may be non-uniform, so, to simulate the fire truck maintaining a constant speed, the various audio signals 132 may include the audio data of the siren for different durations of time. The normalization makes the sound of the audio object of the siren sound like it is moving without the sound volume spiking or dropping out.

To simulate the fire truck driving past the environment more smoothly, the audio signal generator 100 may generate audio signals 132 including audio data of the siren that gradually increase and/or decrease in volume over time. To simulate the fire truck driving past the environment more smoothly, the audio signal generator 100 may generate the audio signals 132 that maintain what may be perceived as a constant volume level in the environment. Normalization can further improve the audible experience of the fire truck driving past the environment by keeping the change of volume to within an allowable region. The operational parameters 120 may include the speaker acoustic properties 116 and the environmental acoustic properties 118 which may be used to determine appropriate volume levels for the various audio signals 132 to provide the effect of a constant volume. The audio heatmap may also be used for normalizing the audio signals 132 to account for accuracies in sound representation by the speakers 144. To simulate the fire truck driving past the environment more smoothly, the audio signal generator 100 may generate audio signals 132 including audio data of the siren in such a way that, although various speakers 144 may play the audio data of the siren starting at different times and for different durations, the sound based on the audio data of the siren may sound continuous to a listener in the environment.

Normalizing can inhibit any unwanted volume spikes in areas of high speaker density or dropout in areas with low speaker density. The audio heatmap can also be used to determine the course that the audio object of the fire truck sounds like it is following so that no dropout occurs in areas without sufficient speaker density. The operational parameters 120 may include the speaker locations 112 which may be used to determine how to play, adjust, clip, or truncate as well as normalize the audio data of the siren such that the sound based on the audio data of the siren may sound continuous to a listener in the environment.

In some embodiments, the audio signal generator 100 may include a playback manager 130 which may include code and routines configured to enable a computing system to perform one or more operations to generate audio signals 132 for speakers 144 in the environment based on operational parameters 120. Additionally or alternatively, the playback manager 130 may be implemented using hardware including a processor, a microprocessor (e.g., to perform or control performance of one or more operations), an FPGA, or an ASIC. In some other instances, the playback manager 130 may be implemented using a combination of hardware and software. In the present disclosure, operations described as being performed by playback manager 130 may include operations that the playback manager 130 may direct a system to perform.

In general, the playback manager 130 may generate audio signals 132 based on the operational parameters 120, the audio data 121, the scene selection 122, the scene data 123, the signal to initiate operation 125, the random numbers 126, and the sensor output signal 128.

The playback manager 130 may be configured to generate unique audio signals 132 that are unique to each of one or more speakers 144 of the audio system. As described above, the unique audio signals 132 may be based on unique operational parameters 120. The playback manager 130 may provide the normalized audio signals when prepared by the configuration manager 110. In some aspects, the playback manager 130 may also be configured as a normalizer 140, and thereby generate the normalized audio signals 142. That is, the playback manager may perform the normalization protocols so that the corresponding speakers 144 provide the sound of the normalized audio object 148 in the defined location.

As an example of the playback manager 130 generating audio signal 132 based on the unique operational parameters 120, an example audio data 121 may include a data stream including multiple channels. For example, the data stream may include four channels of recorded audio from four different microphones in a recording environment. The playback manager 130 may relate the four channels of recorded audio to speakers 144 in the environment based on the relative locations of the microphones in the recording environment, and the speaker locations 112 as represented in the unique operational parameters 120. Based on the relationship between the four channels of recorded audio and the speakers 144 in the environment the playback manager 130 may generate audio signal 132 for the speakers 144 in the environment. For example, the audio system may include six speakers. The playback manager 130 may compose the four channels of recorded audio into six audio signal 132 by including audio from one or more channels of recorded audio into each audio signal 132.

The playback manager 130 may be configured to generate the audio signals 132 based on the audio data 121. The audio data 121 may include any data capable of being translated into sound or played as sound. The audio data 121 may include digital representations of sound. The audio data 121 may include recordings of sounds or synthesized sounds. The audio data 121 may include recordings of sounds including for example birds chirping, birds flying, a tiger walking, mouse scurrying, ball rolling, water flowing, waves crashing, rain falling, wind blowing, recorded music, recorded speech, and/or recorded noise. The audio data 121 may include altered versions of recorded sounds. The audio data 121 may include synthesized sounds including for example synthesized noise, synthesized speech, or synthesized music. The audio data 121 may be stored in any suitable file format, including for example Motion Picture Experts Group Layer-3 Audio (MP3), Waveform Audio File Format (WAV), Audio Interchange File Format (AIFF), or Opus.

The playback manager 130 may include the audio data 121 in the audio signals 132. The playback manager 130 may select audio data 121 from the audio data 121 and, include the selected audio data 121 in the audio signals 132.

In some embodiments, the generation of audio signals 132 may include translating the audio data 121 from one format into the format of the audio signals 132. For example the audio data 121 may be stored in a digital format; and thus, the generation of audio signals 132 may include translating the audio data 121 into another format, such as, for example, an analog format.

In some embodiments, the generation of audio may include combining multiple different audio data 121 into a single audio signal 132. For example, the playback manager 130 may combine audio data 121 of a bird chirping with audio data 121 of ocean waves crashing to generate an audio signal 132 including sounds of ocean waves crashing and the bird chirping to be played at the same time, or overlapping.

In some embodiments, the audio data 121 may include a data stream. The data stream may include a stream of data that is capable of being played at a speaker 144 at, or about the time, the data stream is received. In some embodiments the data stream may be capable of being buffered.

The scene selection 122 may include an indication of a scene which may be selected from a list of available scenes. The scene data 123 may include information regarding the scene. The scene data 123 may include audio data, which may include audio data related to the scene. The audio data may be the same as, or similar to the audio data 121 described above. In the present disclosure, references to audio data 121 may also refer to audio data included in the scene data 123. Additionally or alternatively the scene data 123 may include categories of audio data related to the scene. Examples of scenes may include a beach scene, a jungle scene, a forest scene, an outdoor park scene, a sports scene, or a city scene, for example, Venice, Paris, or New York City. Additionally or alternatively scenes may be related to a movie, or a book, for example a STAR WARS® theme. The scene selection 122 may be an indication to the playback manager 130 of which scene data 123 to obtain for further use in generating the audio signals 132.

The audio signal generator 100 may use a network connection to fetch one or more scene data 123 to be played in a space. The scene data 123 may include a scene description and audio content. In addition, a web-based service (not illustrated in FIG. 1) may send control signals to audio signal generator 100 to change or control the scene that is being played. Additionally or alternatively, the control signals can come from applications or commands on remote computers, phones or tablets. Software running on the audio signal generator 100 can also be updated via the network connection.

The scene data 123 may further include one or more virtual spaces, simulated objects, location properties, sound properties, and/or behavior profiles. Virtual spaces will be described more fully with regard to FIGS. 5A-5B. Virtual spaces of the scene data 123 may further include one or more simulated objects. Simulated objects will be described more fully with regard to FIGS. 5A-5B. The simulated objects of the scene data 123 may include location properties, sound properties, and behavior profiles. Location properties, sound properties, behavior profiles and audio heatmaps will be described more fully with regard to FIGS. 5C-5D.

The signal to initiate operation 125 may include a signal instructing the audio system to initiate operation or the generation of audio in the environment. The signal to initiate operation 125 may also give scene data to the audio system. The playback manager 130 may begin generating the audio signals 132 in response to receiving the signal to initiate operation 125.

The random numbers 126 may be random, or pseudo-random numbers from any suitable source. For example, the random numbers may include random, or pseudo-random numbers based on an algorithm, or measurements of physical phenomena such as, for example atmospheric noise or thermal noise. The random numbers 126 may be generated at the audio system, additionally or alternatively the random numbers 126 may be obtained from another source, such as, for example random.org.

The sensor output signal 128 may be one or more signals generated by one or more sensors of the audio system. The sensor output signal 128 may be based on the type of sensor generating the sensor output signal 128. For example, a sound sensor may generate a sensor output signal 128 relating to sound. The sensor output signal 128 may be an indication of a condition. Additionally or alternatively the sensor output signal 128 may be information relating to a condition. For example, the sensor output signal 128 may indicate that the environment is "occupied." Additionally or alternatively the sensor output signal 128 may indicate a number, or an approximate number of people in the environment.

The audio signals 132 may include one or more signals configured to provide audio when output by a speaker 144. The audio signals 132 may include analog or digital signals. The audio signals 132 may be of sufficient voltage to be output by speakers 144, additionally or alternatively the audio signals 132 may be of insufficient voltage to be output by speakers 144 without being amplified, or they may be sufficiently amplified. The audio signals 132 from the playback manager 130 may be normalized audio signals 142, when the normalizer is part of the audio signal generator 100 (e.g., configuration manager 110 or playback manager 130).

In some embodiments, the playback manager 130 may be configured to generate the audio signals 132. As described above, when the playback manager 130 generates the audio signals 132, the audio signals 132 may be based on the operational parameters 120.

As described above, the playback manager 130 may select particular audio data from the audio data 121 to include in the audio signals 132. The playback manager 130 may select the particular audio data based on the scene selection 122. For example, the particular audio data may be audio data related to the scene selection 122. For another example the particular audio data may be of the same category as the scene selection 122, or the particular audio data may be included in the scene data 123.

In some embodiments, the playback manager 130 may select the particular audio data for inclusion in the audio signals 132 based on the random numbers 126. For example, the particular audio data included in the audio signals 132 may be selected at random, which may mean based on the random numbers 126, from a subset of the audio data 121 that is related to the scene selection 122, or that is part of the scene data 123.

In some embodiments, the playback manager 130 may be configured to adjust the audio signals 132. In some embodiments the playback manager 130 may adjust the audio signals 132 by ceasing to include some audio data in the audio signals 132. In these or other embodiments the playback manager 130 may adjust the audio signals 132 by including some other audio data in the audio signals 132 that was not previously in the audio signals 132. For example, the audio signals 132 may include audio data including sounds of birds singing. Later, the playback manager 130 may cease including audio data of sounds of the birds singing in the audio signals 132 and start including sounds of birds taking flight in the audio signals 132. Changing which audio data is included in the audio signals 132 may be an example of generating dynamic audio.

In some embodiments the playback manager 130 may adjust the audio signals 132 by changing one or more settings, including a volume level, a frequency content, dynamics, a playback speed, or a playback duration of the audio data in the audio signal, which may be done with a normalization protocol. For example, the playback manager 130 may adjust the volume level of audio data 121 in the different audio signals 132 based on the normalization so as to provide the normalized audio signals 142. Additionally or alternatively the playback manager 130 may adjust settings of the audio signals 132. Adjusting the audio signals 132, or the particular audio data included in the audio signals 132 may be an example of the audio system generating dynamic audio. Additionally, the playback manager 130 may adjust the audio signals 132 based on the normalization protocol.

In some embodiments, the audio signal generator 100 may include a normalizer 140 which may include code and routines configured to enable a computing system to perform one or more operations to normalize audio signals 132 for speakers 144 in the environment based on operational parameters 120 and the audio heatmap. Additionally or alternatively, the normalizer 140 may be implemented using hardware including a processor, a microprocessor (e.g., to perform or control performance of one or more operations), an FPGA, or an ASIC. In some other instances, the normalizer 140 may be implemented using a combination of hardware and software. In the present disclosure, operations described as being performed by normalizer 140 may include operations that the normalizer 140 may direct a system to perform.

Modifications, additions, or omissions may be made to the audio signal generator 100 without departing from the scope of the present disclosure. For example, the audio signal generator 100 may include only the configuration manager 110 or only the playback manager 130 in some instances. In these or other embodiments, the audio signal generator 100 may perform more or fewer operations than those described. In addition. The different input parameters that may be used by the audio signal generator 100 may vary. In some embodiments, the normalizer 140 is part of the audio signal generator 100, such as part of the configuration manager 110 or the playback manager 130.

Figure 1B:
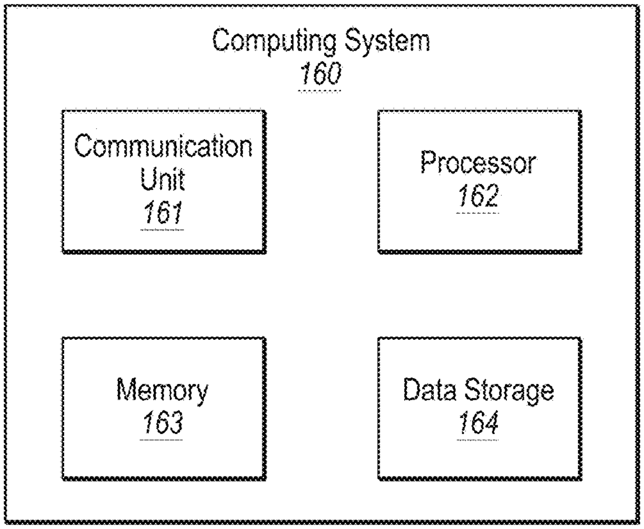
FIG. 1B is a block diagram of an example computing system that can be configured as an audio signal generator or otherwise operate an audio system.

FIG. 1B is a block diagram of an example computing system 160; which may be arranged in accordance with at least one embodiment described in this disclosure. As illustrated in FIG. 1B, the computing system 160 may include a processor 162, a memory 163, a data storage 164, and a communication unit 161.

Generally, the processor 162 may include any suitable special-purpose or general-purpose computer, computing entity, or processing device including various computer hardware or software modules and may be configured to execute instructions stored on any applicable computer-readable storage media. For example, the processor 162 may include a microprocessor, a microcontroller, a digital signal processor (DSP), an ASIC, an FPGA, or any other digital or analog circuitry configured to interpret and/or to execute program instructions and/or to process data. Although illustrated as a single processor in FIG. 1B, it is understood that the processor 162 may include any number of processors distributed across any number of network or physical locations that are configured to perform individually or collectively any number of operations described herein.

In some embodiments, the processor 162 may interpret and/or execute program instructions and/or process data stored in the memory 163, the data storage 164, or the memory 163 and the data storage 164. In some embodiments, the processor 162 may fetch program instructions from the data storage 164 and load the program instructions in the memory 163. After the program instructions are loaded into the memory 163, the processor 162 may execute the program instructions, such as instructions to perform one or more operations described with respect to the audio signal generator 100 of FIG. 1.

The memory 163 and the data storage 164 may include tangible, non-transient computer-readable storage media or one or more computer-readable storage mediums for carrying or having computer-executable instructions or data structures stored thereon. Such computer-readable storage media may be any available media that may be accessed by a general-purpose or special-purpose computer, such as the processor 162. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other tangible storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 162 to perform a certain operation or group of operations.

In some embodiments the communication unit 161 may be configured to obtain audio data and to provide the audio data to the data storage 164. Additionally or alternatively the communication unit 161 may be configured to obtain locations of speakers, and to provide the locations of the speakers to the data storage 164. Additionally or alternatively the communication unit 161 may be configured to obtain locations of sensors, and to provide the locations of the sensors to the data storage 164. Additionally or alternatively the communication unit 161 may be configured to obtain acoustic properties of the speakers, and to provide the acoustic properties of the speakers to the data storage 164. Additionally or alternatively the communication unit 161 may be configured to obtain acoustic properties of an environment, and to provide the acoustic properties of the environment to the data storage 164. Additionally or alternatively the communication unit 161 may be configured to obtain a selection of a scene, and to provide the selection of the scene to the data storage 164. Additionally or alternatively the communication unit 161 may be configured to obtain a signal to initiate operation, and to provide the signal to initiate operation to the data storage 164. Additionally or alternatively the communication unit 161 may be configured to obtain a random number, and to provide the random number to the data storage 164. Additionally or alternatively the communication unit 161 may be configured to obtain a sensor output signal, and to provide the sensor output signal to the data storage 164. Additionally or alternatively the communication unit 161 may be configured to obtain scene information, and to provide the scene information to the data storage 164.

Modifications, additions, or omissions may be made to the computing system 160 without departing from the scope of the present disclosure. For example, the data storage 164 may be located in multiple locations and accessed by the processor 162 through a network.

In some embodiments, the computing system described herein with the audio signal generator and the normalizer (e.g., in any of the embodiments) can be used in methods to normalize one or more audio signals for one or more speakers, and preferably normalizes a plurality of audio signals for a plurality of speakers, for generating an audible sound of an audio object in a particular location in real time. The methods can be performed with an audio system that is configured for rendering audio in a three dimensional space in an environment where the audio system includes speakers placed in precise locations around the room and the audio data being configured so that audio object are perceived to be in specific locations in real time. An established stereo system (e.g., 5.1, 6.1, 7.1 or others known or developed in the future) requires each speaker to be located in an exact spot to achieve a convincing "surround sound". The audio controller can precompute volume for each channel because the speakers positions are well known. However, in many instances and environments is not possible to have a standard where the speakers are in exact locations in a plurality of venues because the size, shape, features, fixtures, and many other environmental aspects are inconsistent across different venues. As a result, complicated environments may require special audio system and specific speaker configurations as well as unique audio data and programming. This complicates the ability to create playback configurations for many different types of venues because each unique venue may require its own content or playback configurations, and thereby each content or playback manager is different. Accordingly, the present audio system overcomes this issue by normalizing the audio signals before the audio is emitted from the speakers. The normalization allows for a single version of the content to be deployed across highly variant venues (e.g., spaces) and speaker installations. The normalization often distributes the participation of rendering an audio object across a plurality of speakers.

The audio systems described herein are complicated and adapted to fit the venue where it is setup with the placement of the speakers often being unique. As a result, the audio systems cannot being configured simply as the 5.1 stereo system can be, and thereby require some sophisticated processing to provide suitable 3D sound for representing audio objects in specific locations in real time, such that the audio object can sound like it is at a specific location while stationary or moving. Because speakers in the present audio systems aren't placed in predefined locations (e.g., predefined locations in a movie theater), the playback manager with audio render functionality has to calculate how much gain is needed for each audio signal (e.g., each audio signal with audio data to represent the audio object) to properly represent the sound in space so that the audio object sounds like it is in a specific location or moving across a particular pathway. This becomes difficult in areas with high speaker density and low speaker density, but can be performed by normalizing the audio signals for the speakers to account for high speaker density and low speaker density. For example, if an object is near four different speakers, the gain to each speaker may be turned down to prevent an over representation of the sound; however, the amount of gain reduction for each speaker can be calculated with the normalization protocol so that the volume does not spike or dropout. On the other hand, when there are no speakers near the location the audio object should sound like it is located, the nearest speakers may need the gain of each speaker to be turned up to compensate; however, the amount of gain increase for each speaker can be calculated with the normalization protocol. If the audio object still cannot be accurately rendered by the speakers, the system may determine to cancel the audio object during a particular rendering in order to avoid volume spikes or dropout.

Figure 2:
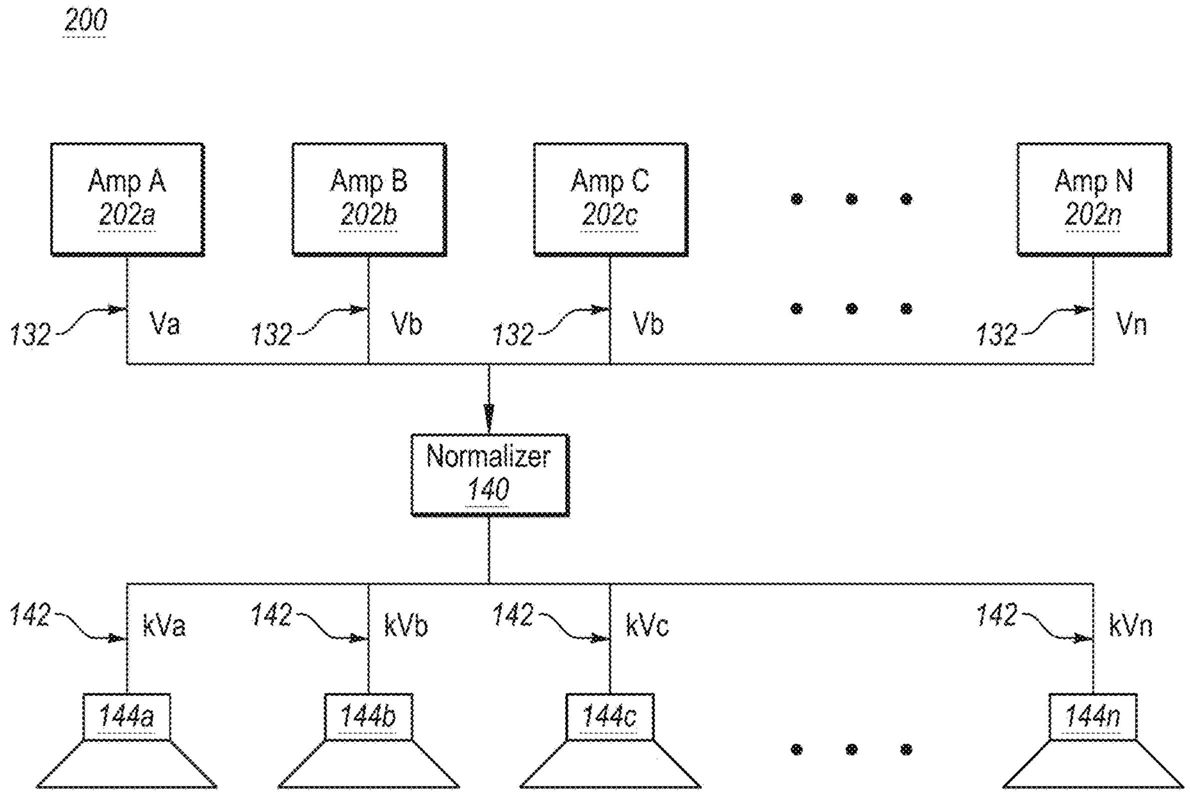
FIG. 2 is a block diagram of a portion of an audio system having a normalizer between amplifiers and speakers.

FIG. 2 illustrates an embodiment of a normalization system 200 that is configured to normalize the audio signals for one or more speakers 144*a*-144*n*. As shown, amplifier A 202*a* provides an audio signal 132 with volume Va, amplifier B 202*b* provides an audio signal 132 with volume Vb, amplifier C 202*c* provides an audio signal 132 with volume Vc, and amplifier N 202*n* provides an audio signal 132 with volume Vn. The audio signals 132 are provided to a normalizer 140, which can be a computing system 160 or part of a computing system 160 or at least have the calculation functionality of a computing system so that the audio signals 132 can be normalized into normalized audio signals 142. As a result, the normalized audio signal 142 from amplifier A 202*a* has a normalized volume of kVa for speaker A 144*a*, the normalized audio signal 142 from amplifier B 202*b* has a normalized volume of kVb for speaker B 144*b*, the normalized audio signal 142 from amplifier C 202*c* has a normalized volume of kVc for speaker C 144*c*, and the normalized audio signal 142 from amplifier N 202*n* has a normalized volume of kVn for speaker N 144*n*. Accordingly, the "k" is the normalization factor for the volume data provided to each speaker 144.

In some embodiments, the normalization protocol can use basic normalization, which provides a normalization solution to have the total intensity I of every object set to 1. The protocol can define Vi as the volume of speaker "i", and thereby it should be recognized that Va is the non-normalized volume of the audio signal 132 of speaker A 144*a* that after normalization with the normalizer 140 results in a normalization audio signal 142 of kVa for Speaker A 144*a*. The other speakers each also receive a normalized audio signal 142 that has been normalized for the specific speaker to emit the sound so that the one or more speakers provides for the normalized audio object in the defined location.

In order to a render a sound object with a set of speakers, each speaker in the room will contribute a certain amount of sound or volume to make an audio object appear as is if it is in the room. The controller in the system (e.g., configuration manager and/or playback manager) described herein determines how loud each speaker should be to place the sound in the room. To make the calculations, the system defines the audio object (x) as being a distance ($d_i$) from a specific speaker ($s_i$). The volume (V) at the speaker $s_i$ is calculated using the following equation:

$$V_i = \frac{k}{d_i^r}. \quad \text{Equation 1}$$

The "r" in Equation 1 is the "roll off" factor that affects how much sound is distributed throughout a room. If the roll off is small, then the volume is large or stays large even when the distance is large. If the roll off is large, then V is small and/or decreases as the distance increases. The "k" is the normalization factor that is calculated to keep the sound at consistent volumes throughout the room, which is used for normalization as described herein. To understand normalization, if k is 1 and the distance goes to zero, then the volume goes to infinity, which is unfavorable. If k is 1 and the distance goes to infinity, then the volume goes to zero. However, the normalization factor should keep objects from disappearing or getting too loud. To help the functionality of the normalization factor, the function to calculate k prevents objects from becoming too loud by limiting the total intensity of all speakers in the system to be no more than 1. The function also turns the $V_i$ of each speaker to prevent the total intensity of all speakers from being 0. The protocol can be broken down into two steps.

The first step includes calculating the volume at each speaker with k=1. Then, calculating the appropriate k so that the desired volume or behavior of the audio object is obtained. The intensity (I) is equal to the square of the volume, such as the intensity is defined as $I=(V_i)^2$ for speaker "i," exemplified by $I=(Va)^2$ for speaker A 144*a*. The following equations are used with k=1:

$$V_i' = \frac{1}{d_i^r}. \quad \text{Equation 2}$$

$$I_{total} = \sum_{i=1}^{N} V_i^2 = f\left(\sum_{i=1}^{N} V_i'^2\right). \quad \text{Equation 3}$$

$$f(x) = \tanh(4x-2)\frac{\alpha-\beta}{2} + \frac{\alpha+\beta}{2}. \quad \text{Equation 4}$$

The normalization function can be chosen in such a way that the protocol can set its max and min values, and that it is both smooth and continuous. See FIGS. 3A-3C discussed in more detail below, which show the functions for various values and to provide some intuition of its behavior.

Once the above equations are obtained, the k value is isolated with the following equations:

$$I_{total} = \sum_{i=1}^{N} V_i^2 = \sum_{i=1}^{N} \frac{k^2}{d_i^{2r}} = k^2 \sum_{i=1}^{N} \frac{1}{d_i^{2r}}$$

Then, Equation 3 is used as follows:

$$k^2 \sum_{i=1}^{N} \frac{1}{d_i^{2r}} = f\left(\sum_{i=1}^{N} \frac{1}{d_i^{2r}}\right) \quad \text{Equation 5}$$

$$k = \sqrt{\frac{f\left(\sum_{i=1}^{N} \frac{1}{d_i^{2r}}\right)}{\sum_{i=1}^{N} \frac{1}{d_i^{2r}}}}.$$

Then, Equation 1 is used to get Equation 6:

$$V_i = \frac{1}{d_i^r} \sqrt{\frac{f\left(\sum_{i=1}^{N} \frac{1}{d_i^{2r}}\right)}{\sum_{i=1}^{N} \frac{1}{d_i^{2r}}}}. \quad \text{Equation 6}$$

In some embodiments, basic normalization of audio signals allows for the audio system to render an audio object by sound emitted from a plurality of speakers. The location or movement of an audio object can then be compensated for when there are too many speakers that otherwise would cause excessive loudness or volume spikes, or when there are too few speakers that otherwise would cause unevenness and rapid volume dropouts. Rapid volume dropouts can be characterized to sound like the audio object suddenly ceases in mid rendering or performance. The basic normalization can still be used to calculate speaker density parameters and determine the loudness for each speaker that cooperates to render the audio object. The volume can be adjusted independently for each speaker to improve the evenness of the sound quality. For example, the speakers closest to the location of rendering an audio object can be modulated for the volume for the sound emitted for the audio object. This can be done in real time and may be based on an audio heatmap as described herein.

While this basic normalization may be useful in some instances, the setting of the intensity I to 1 results in a full volume for the audio object. As a results, the audio object always being normalized to its full volume can push the audio to the closest place in which the audio object has accurate speaker representation. For example, if the audio object is a mouse scurrying across a floor, but the audio system does not include any floor or sub-floor speakers and only has elevated speakers, then the audio object of the mouse and its sound can be snapped to the level of the nearest speaker so that the sound of the mouse appears to be from the air or above the ground and does not sound like the mouse is on the floor. Presenting the sound of a mouse audio object in midair can cause confusion and ruin an audio experience for an listener. Accordingly, some audio experiences may be properly presented with the intensity I set to 1; however, some audio experiences may be compromised with this setting. In some instances, it may be better for the intensity I to vary or be less than full volume.

Setting the intensity I to less than 1 can allow for a sound to dropout when there is not adequate speaker density or positioning. In some instances, it may sound better and provide an overall better ambiance if the sound of the mouse disappears rather than sound like it is flying through the air if the speaker placement is inadequate to represent the mouse audio object scurrying on the floor.

Modulating the intensity I and volume for the audio object at one or more speakers can provide for dynamic normalization by allowing intensity I to vary. The dynamic normalization can allow for even sparse speaker regions to provide an enhanced audio ambiance by dropping audio objects that cannot be properly represented by the speaker configuration. Rather than the mouse audio object sounding like it is flying through the air, the sound of the mouse drops out to avoid sounds that the listener would know are wrong and reduce or eliminating distracting and erroneous sounding audio objects.

Accordingly, dynamic normalization can allow for the total object intensity I to be a function of speaker density. Reference is made to the foregoing equations, such as Equation 4. The mathematical protocol for calculating and values can be done to determine the sound potential at a specific location for accuracy and importance. The default values for and are 1 and 0, respectively. However this configuration only has the functionality of limiting the maximum output to 1. In essence, represents the "importance" of a sound. A high value can signify that the sound should never be lost. An example of this would be a lead vocal in a song that needs to be present or a main character voice or animal sound in a simulation. The higher value can cause the sound to be present even if there is inadequate speaker density. A low value can signify that the sound is not important and can be dropped if the speaker density is too low for a proper sound. For example, a mouse scurry audio object may have a low value so that when there are not ground or sub-floor speakers the sound can be dropped instead of inaccurately sounding like the mouse is flying. As such, the value can be determined based on the importance of the sound being maintained versus consequence of audio ambiance if the sound is dropped.

The then represents the "accuracy" of a rendering. That is, the provides an indication for whether or not the sound can be well represented by the speaker distribution in the audio system. A low means that the sound cannot be represented well by the speakers in the audio system, and the priority is not allow the volume of the speakers for the audio object to jump up and down. A high means that the sound can be well represented by the speakers, such that the speaker density is sufficient to allow for representation of the audio object so that the volume does not jump up and down or spike or dropout.

This allows for the creation of realistic scenes in any environment with different speaker arrangements. The normalization protocol can provide for enhanced reality in a real-time experience of the sound of audio objects independent of the speaker distribution. Now, the sound of the audio object will appear to be a specific position in real time so that as the audio object moves it sounds like it is moving without volume spikes or drop-offs from one or more speakers. The normalization allows for one or more speakers (e.g., often a plurality of speakers) to be coordinated in the volume level they emit for rendering the audio object, so that together the output sounds as if the audio object is in the desired location. Accordingly, the speakers can have coordinated output to generate the audio object in a specific location and having a playback manager, or other module, that is configured to provide the appropriate content with adjustments so that the audio object can be accurately represented by the speakers in the audio system. The normalization allows for the importance and accuracy requirements of a specific audio object, and making calculations so that the speakers work together by adjusting and reacting to the requirements to get the accurately rendered audio object. The requirements of the content for the audio object in view of the effectiveness of an audio system (e.g., see audio heatmap) can be used to create the representation of the audio object and to modify the audio signals to normalized audio signals in reaction to the known parameters (e.g., speaker density and sound potential profiles) of the audio system.

Figure 3A:
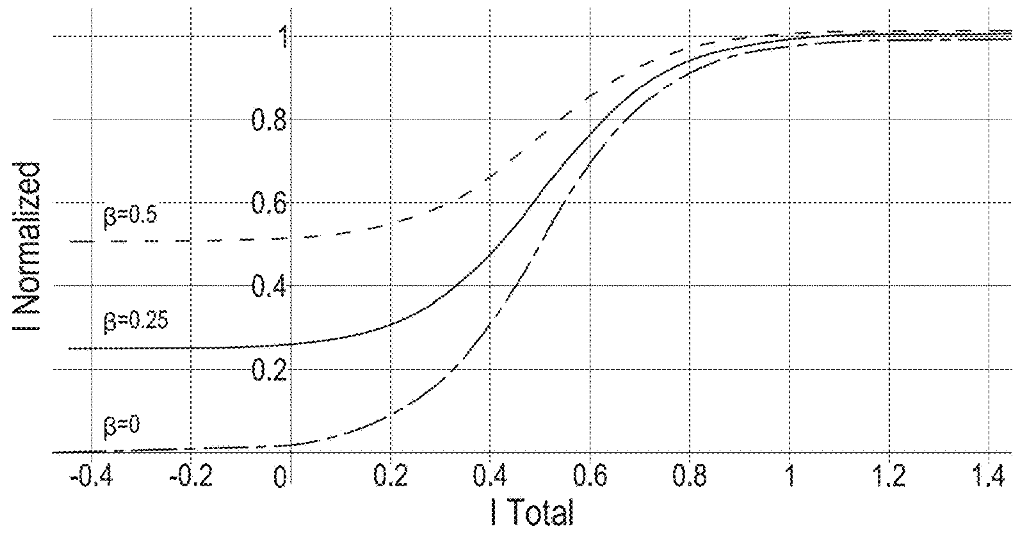
FIGS. 3A-3C show graphs related to normalization of audio signals with dynamic normalization for various a values and β values.
Figure 3B:
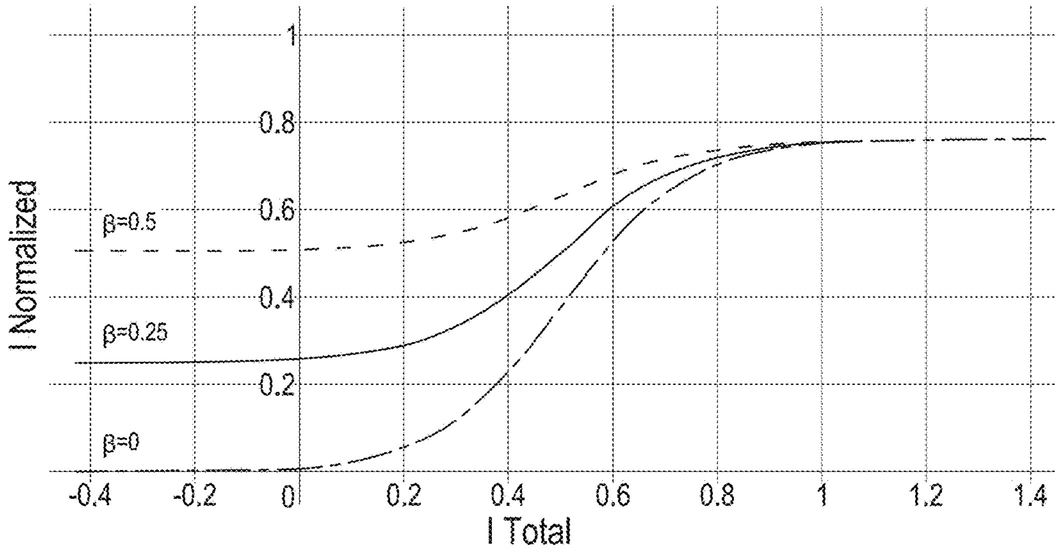
Figure 3C:
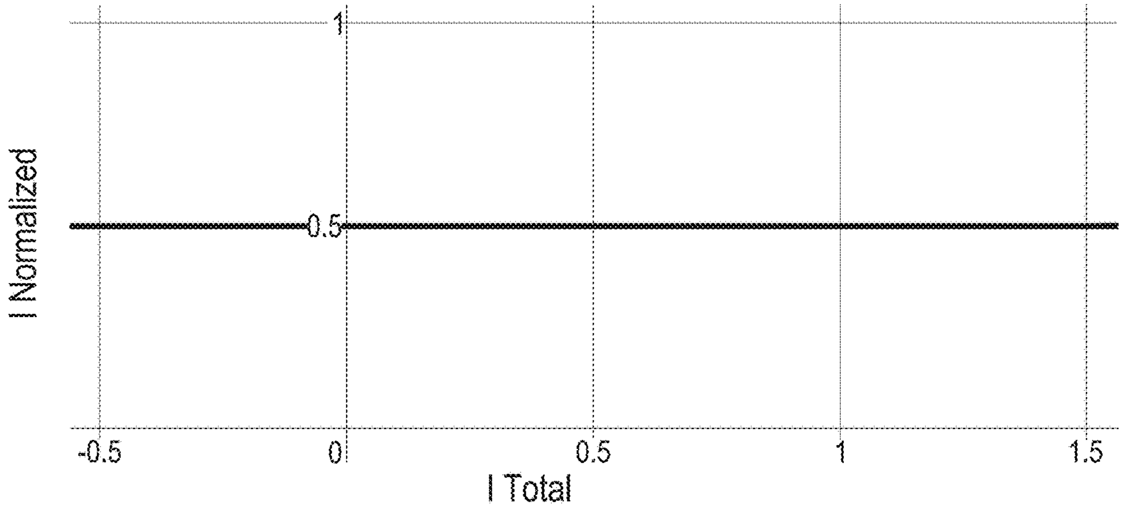

In accordance with the foregoing under Equation 4, the calculations include the graphs of FIGS. 3A-3C. FIG. 3A shows the graph when: is 1 and varies from 0 to 0.25 to 0.5. FIG. 3B shows the graph when is 0.75 and varies from 0 to 0.25 to 0.5. FIG. 3C shows the graph when and are both 0.5, which shows the flat line. Here, is greater than or equal to, where is a maximum and is a minimum. Graphs for other values of and can also be graphed, such as is 0.5 and is 0, is 1 and is 0.49. These graphs correspond to FIGS. 3A-3C.

In an example, the is representative of the quietest possibility of the sound. When set to zero, the sound can drop off completely. As is increased, then the lowest possibility of the sound is increased. When is one, then the sound never drops off. The is representative of the maximum loudness of the sound, which at one can be full volume at 1. When is 0.5, then the maximum is half volume. This shows the dynamic range that the sound of the audio object can have by normalization.

The dynamic normalization protocol can be used in audio systems to improve smooth rending of audio objects that have regular or irregularly placed speaker distributions. The normalized audio signals provide consistent audio for an audio object, such that the audio object sounds to have behaviors and patterns of the physical object being represented by the rendered audio object. That is, flapping wings, scurrying feet, or blowing leaves do not have patches of volume vacillation when normalized. Accordingly, now single-versions of content can be created and used in many different audio systems that have dynamic normalization. The dynamic normalization can normalize the audio signals across the speakers in real time so that instead of adjusting content for a venue, the sound emission profile of the venue is adjusted and normalized for the content. The location of rendering an audio object can be analyzed and unsuitable locations can be tagged for avoiding with the audio object. Adjustments in rendering location of an audio object can be made to provide the smooth sound to avoid problematic regions with unsuitable speaker distributions. The adjustments can prevent sound spiking or rapid dropout in view of the object placement needs of the audio object (e.g., mouse cannot fly).

The normalizer can calculate the ability of each of one or more speakers to properly render a specific audio object in a specific location. When the combination of speaker output profiles in a speaker arrangement is unable to effectively render the audio object, the normalization protocol can adjust the output of each speaker for a cooperative improvement is rendering the audio object. This can smooth out any peaks or troughs in sound quality during rendering of the audio object. As shown, the volume for each speaker can be mapped to a curve that considers the α and β values and defines maximum and minimum normalization adjustments for smooth sounding audio objects without volume spikes or rapid dropout.

Figure 4A:
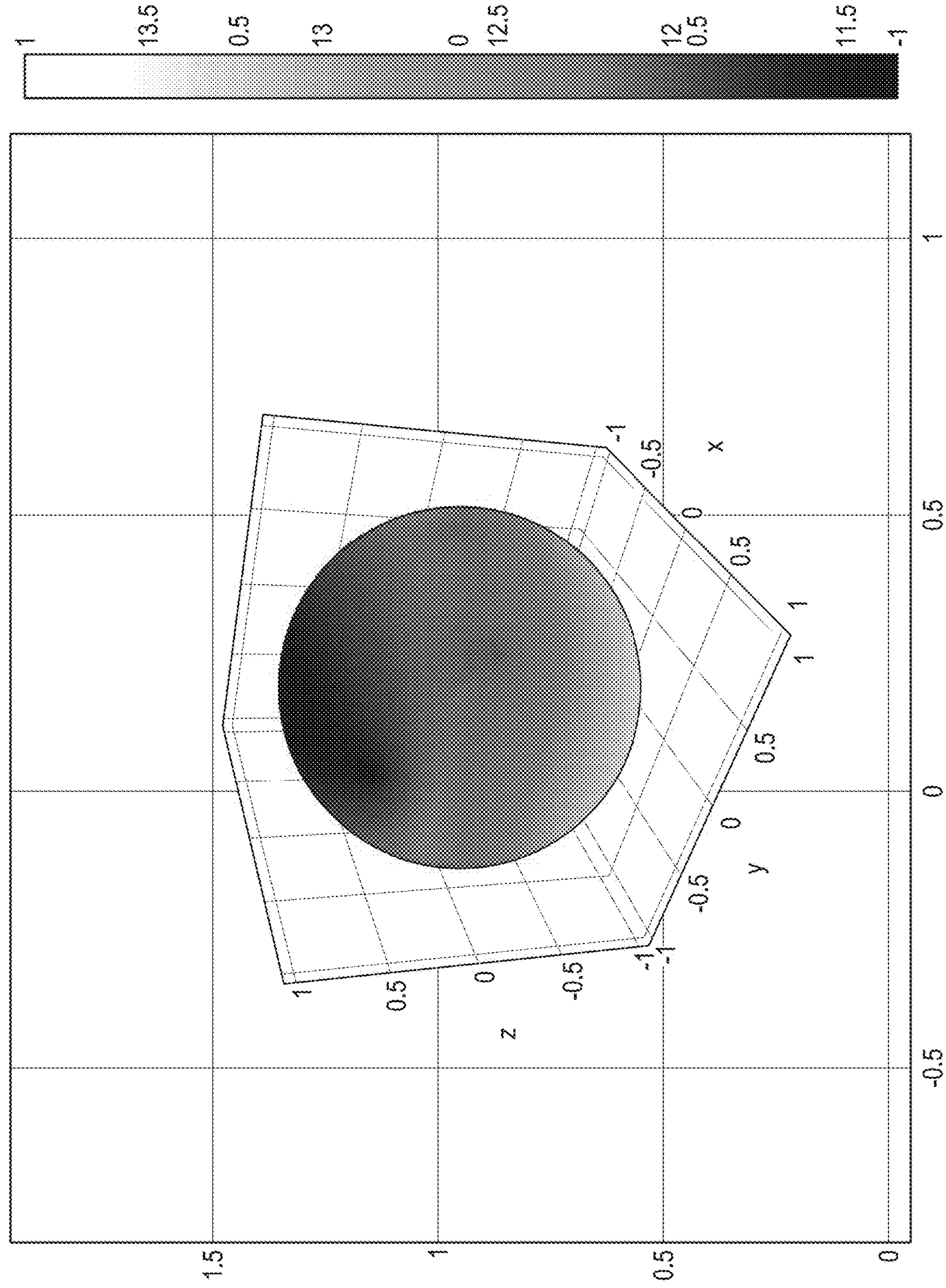
FIG. 4A is a perspective diagram of a spherical audio heatmap.
Figure 4B:
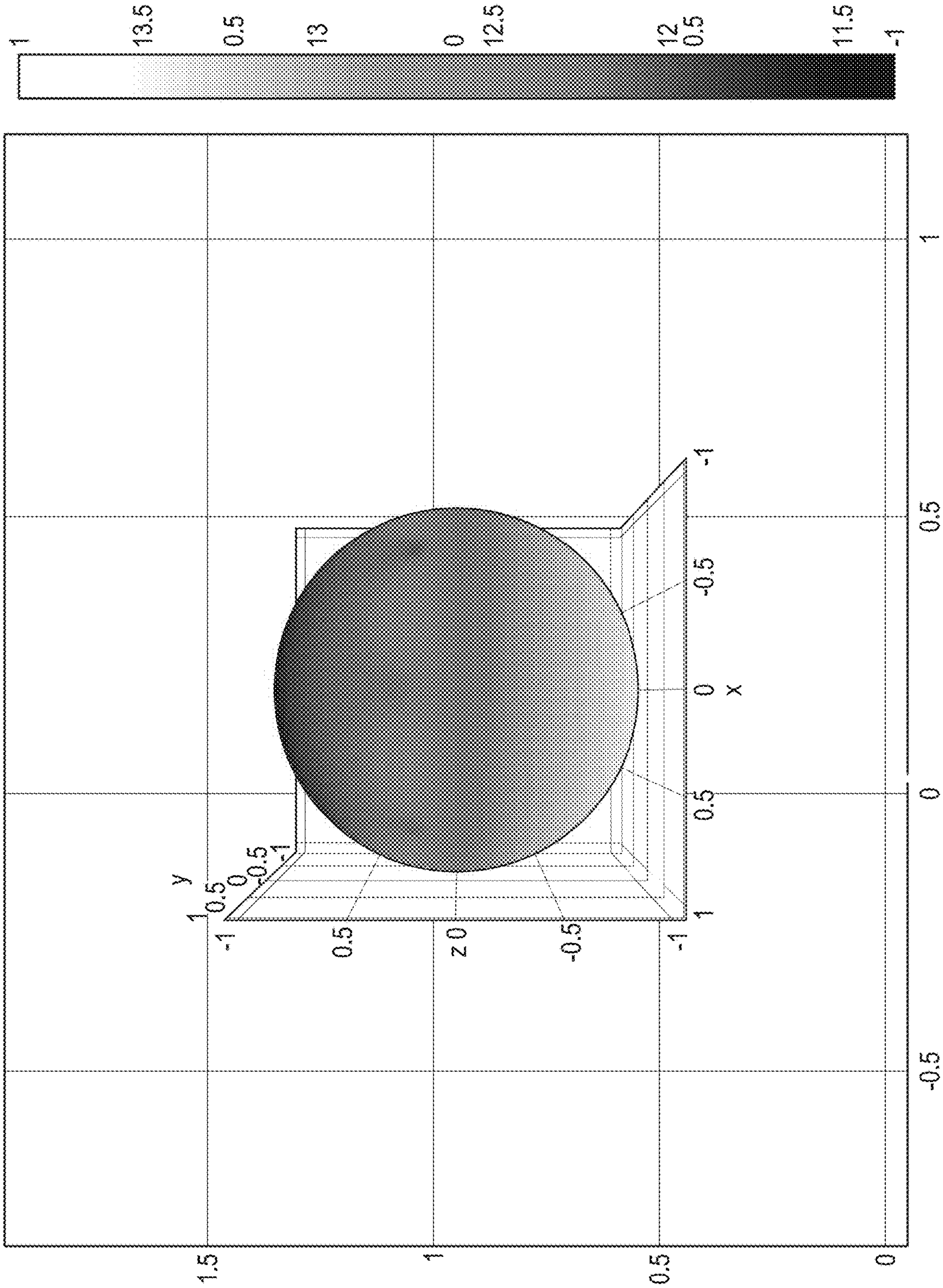
FIG. 4B is a side view diagram of a spherical audio heatmap.
Figure 4C:
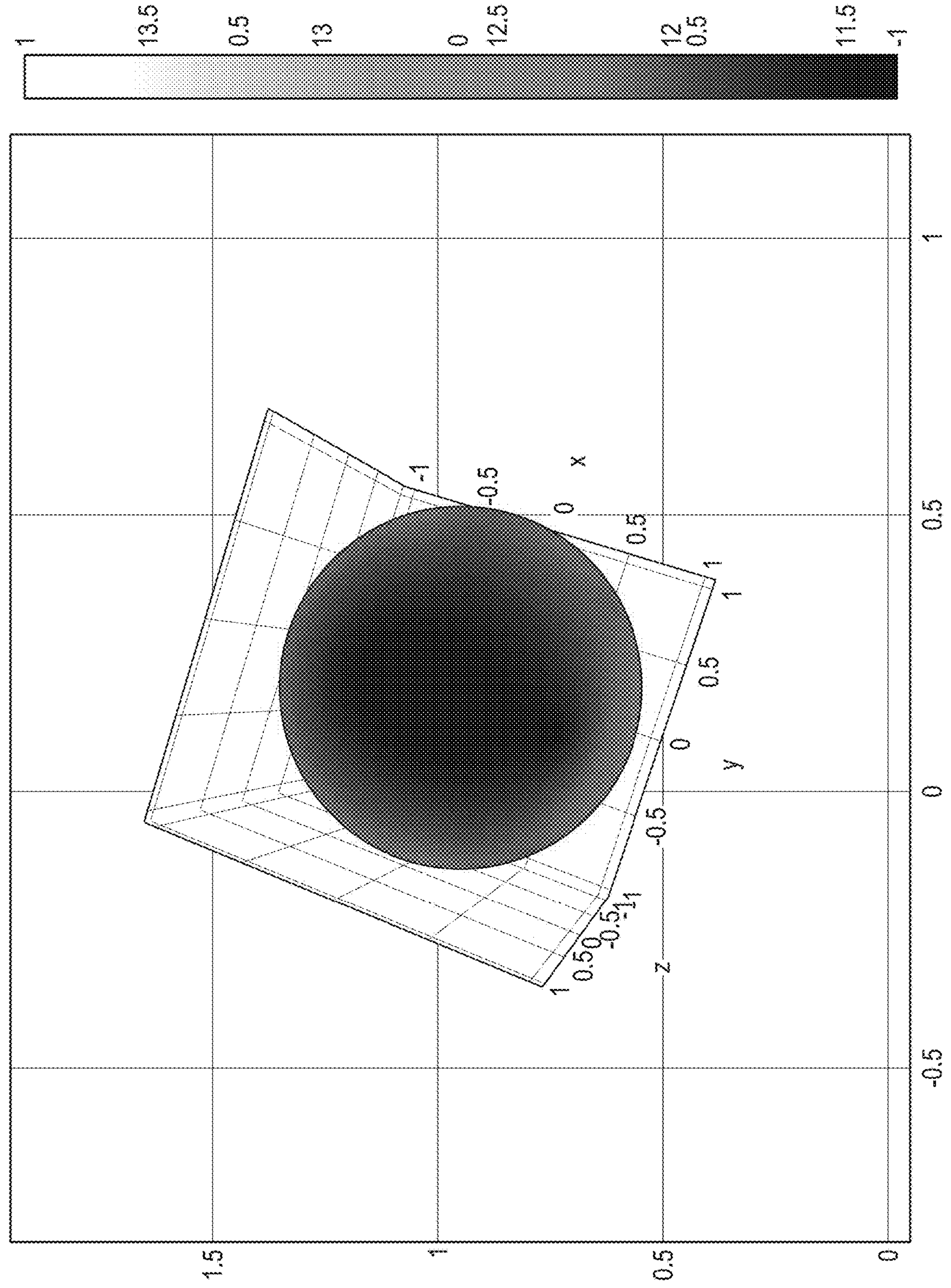
FIG. 4C is a top view diagram of a spherical audio heatmap.

FIGS. 4A-4C illustrates a generic audio heatmap, with the maximum volume potential being 1 (dark) and the minimum volume potential being −1 (light). As shown, the loud volume potentials are at the bottom, such as when speakers are on the floor or floor in in a subfloor. The quite or soundless volume potentials are at the top, such as when speakers are on the floor or floor in in a subfloor. A suspended speaker arrangement with none at ground level would be the opposite orientation that is shown in FIG. 4A. The audio heatmap may also be used, such as for calculating the values. The heatmap can provide default values for a speaker distribution in a venue. The audio heatmap can be analyzed to determine the average accuracy throughout the venue in view of the speaker distribution (e.g., considering position, direction, radiation pattern, or other speaker parameters). FIG. 4A is a perspective diagram of a spherical audio heatmap. FIG. 4B is a side view diagram of a spherical audio heatmap. FIG. 4C is a top view diagram of a spherical audio heatmap.

In some embodiments, the average accuracy of an object "path" can be calculated using the heatmap and used to calculate alpha and beta values. In some aspects, the method includes calculating the "path integral" of the motion path of the object over the heatmap.

Figure 4D:
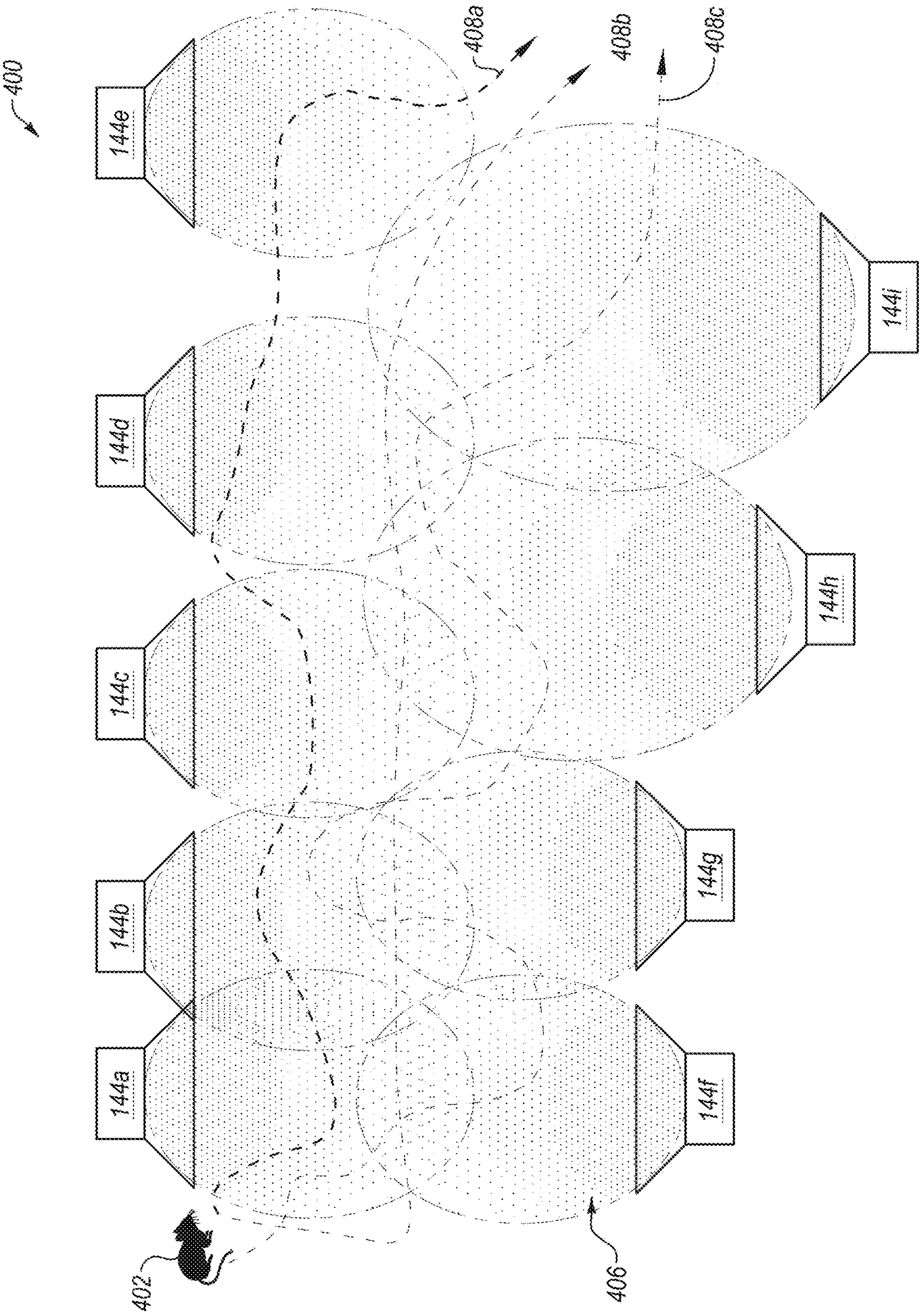
FIG. 4D is a diagram of an arrangement of speakers with the corresponding sound profiles and overall audio heatmap from the arrangement of speakers.

FIG. 4D illustrates a top view of a schematic representation of an audio heatmap 400 that shows the location of a plurality of speakers 144*a*-144*i* relative to each other. It should be recognized that the audio heatmap 400 is an idealized version for use in explaining the properties of an audio system. Each speaker 144 is shown to have a representation of the sound potential 406 that can be emitted therefrom. The speaker 144*a* is shown to have a sound potential 406 that is darker nearer to the speaker 144*a* and that lightens further away from the speaker 144*a*, which shows that the highest sound potential 404 is closer to the speaker 144*a*, and that the sound potential 406 decreases moving away from the speaker 144*a*. Thus, the sound potential 406 for each speaker 144 is darker for louder sound potential and lighter for quitter to no sound potential. The adjacent speakers, such as 144*a* and 144*b*, show a darkening where the sound potentials 406 overlap. As such, an area covered by two or more speakers 144 can provide for increased sound potential where the sound potential overlaps. Also, the regions between the sound potential 406 for adjacent speakers, such as shown between speaker 144*d* and speaker 144*e*, may be a region that no sound is possible due to possibly improper speaker placement.

Also, a mouse 402 is shown, which can be represented by an audio object presented by the speakers 144. The mouse 402 is shown to have three different travel paths 408*a*, 408*b*, and 408*c*. Path 408*a* shows that the mouse traverses regions of the sound potential that are darkened so that the speakers 144 can portray the sound, and then then across lighter regions where it is more difficult to get enough volume from the speakers 144 to accurately display the sound. Also, the path crosses regions covered by at least two speakers (e.g., 144*a*, 144*b*), which can cause both of the speakers 144*a*, 144*b* to compensate for the overlap so that the mouse scurry sounds consistent. Also, there is a gap between speaker 144*d* and speaker 144*e*, where there may be a complete drop off in the sound of the mouse scurry. The normalization can use the heatmap 400 and the content to determine whether the mouse 402 continues through the sound potential 406 of speaker 144*e* or just disappears after leaving the sound potential 406 of speaker 144*d*. In some instances, it may be better for the audio ambiance if the mouse 402 sounds like it disappears permanently after leaving the sound potential 406 of speaker 144*d*; however, in other instances having the mouse 402 sound like it reappears in the sound potential 406 of speaker 144*e* may be fine. The normalization can also use the heatmap 400 to make a sound taper (slowly from high to low) as the mouse 402 approaches the gap between 144*e* and 144*e*. Also, the normalization can also use the heatmap 400 to make a sound gradually increase (slowly from low to high) as the mouse enters into the sound potential 406 of speaker 144*e*. Path 408*b* is almost entirely in regions with very low sound potential 406, and as a result the audio system may determine that the sound of the audio object of the mouse 402 may be too intermittent to be useful and may select path 408*b* for omission from the audio. Path 408*c* goes between regions of low sound potential 406 and regions of high sound potential, and often moves into regions covered by a few speakers 144. The heatmap 400 can be used to determine if the path 408*c* is presented or omitted, or modified. For example, the volume of path 408*c* may be set lower so that the volume is suitable for transitioning between dense and sparse sound potential regions.

The heatmap 400 can be used to calculate the values. In some instances, there can be a default value of a venue having an audio system with speaker placement. The arrangement of speakers 144 can provide for specific regions in the venue that have specific values, as shown by the heatmap 400. The system can analyze the heatmap 400, which may be as provided FIG. 4D or as presented as a sphere thereof as shown in FIG. 4A, and calculate an average value or accuracy for the entire venue. The average value or accuracy throughout the venue can identify the volume that an audio object can have as a base value or accuracy. Then, a proposed path, such as mouse path 408*a* is provided, the system can analyze the path 408*a* and sum all of the values or accuracy there along, which provides a specific value or accuracy of the sound of the audio object on that path 408*a*.

The qualities of each speaker and output thereof as well as the closeness of the speaker to a specific location that the audio object is rendered can be considered in the normalization protocol, and can be used in evaluating the potential accuracy of the audio object for one speaker or a combination of speakers. Based on the speaker properties and the placement of the rendering of the audio object, the value or accuracy for the audio object for one speaker or for all of the speakers that may potentially render the audio object may be determined. All of the speakers with sound potential for a specific location can be analyzed to obtain the value or accuracy that the audio object can achieve based on the distribution of the speakers and the resulting audio heat map.

In some embodiments, once the audio heatmap is defined for a specific audio system in a venue, the heatmap stays the same unless speakers are moved or reoriented. Accordingly, the system can map a plurality of movement paths for an audio object in order to determine those paths that are suitable to provide consistent audio without volume spikes, too many dropouts, or causing the audio object to have a bad placement (e.g., mouse sounding like it is flying).

For each speaker in the audio system, once the direction of influence (e.g., direction the sound is primarily aimed) is known (e.g., which can be mapped with microphones or other audio sensors or calculated based on known speaker parameters), the axis of radiation of sound is known. The axis of radiation can then be used to calculate the value or accuracy for the audio object for a defined distance from the respective speaker, such as the distance to the axis of radiation. This value or accuracy for the defined distance to the audio object can then be analyzed for each speaker and the proper speaker volume can be determined for each speaker so that the sum of the speaker influence provide for the continuous smooth sound without volume spikes or rapid dropout. The value or accuracy can then be determined for a speaker pair, three speaker combination, or any number of speaker combinations that cooperate to make the audio object sound like it is present at the defined location. The specific speakers assigned to support the audio object with sound can be defined, and the volume at which they support and render the audio object can be determined so that the audio object has a specific sound quality that is consistently smooth without volume spikes or rapid dropout. The accuracy of the audio object can be determined for specific locations in the venue, where the specific locations have defined distances from the respective rendering speakers, and a path of specific locations can be mapped for the accuracy at each point. The system can then determine the volume of each rendering speaker. Thus, the general accuracy of rendering the audio object can be determined for the entire venue.

The heatmap can remain the same for a venue when the same speaker system distribution is used. Changes to the speaker system distribution can result in a change to the heatmap. As a result, deficiencies in the influence of the speaker system can be identified and rearrangement and modulation in placement, orientation, and properties of one or more speakers can be made to provide a better distribution or influence gradient. The better distribution or influence gradient can be observed by more homogenous influence in a heatmap.

The heatmap can be generated and optimized in order to maximize the ability to accurately control the sound of a rendered audio object at a specific location or along a movement path. The heatmap can be used to determine or adjust speaker placement in an environment in order to render an optimized audio object. The protocols can be performed with any speaker arrangement in an environment in order to accurately render audio objects in specific locations or on movement paths by using a heatmap, and the heatmap can provide information for the types of audio objects and locations of audio object rendering that can be performed with the defined speaker arrangement. For example, a room with no floor speakers may have difficulty in rendering a mouse audio object scurrying across the floor. The heatmap can show the appropriate coverage for audio objects for the specific speaker arrangement. The appropriate coverage can include speakers that can make sounds that render an audio object so that it sounds like the audio object is in the room at the given location. The heatmap can be generated to include a location of each speaker in the environment. The heatmap can include an axis of direction for each speaker in the environment. The heatmap can include the audio dispersion characteristics of each speaker. This information can be used for an accurate heatmap. The heatmap allows for calculation of the coverage of a certain point in the environment with the speaker arrangement, such as by determining the distance of the certain point to one or more speakers in the speaker arrangement, which may also consider the angle from the axis of direction of each speaker to the certain point, and which may also consider the dispersion cone of the one or more speakers and whether or not the certain point is within a specific dispersion cone of one or more speakers.

The calculation of a heatmap can be performed as follows. A function is defined that considers a position point in an environment, a matrix of speaker positions in the environment, and a matrix of speaker orientations (e.g., directions) and output the coverage of that position point in the environment, such as follows:

$$h(\vec{x}, S, V) = c, s.t\ c \in R \quad \text{Equation 7.}$$

S and V are matrices, where S is the matrix that represents the positions of all of the speakers in the environment and V is the matrix that represents the directions of all of the speakers in the environment. For this, speaker $S_1$ has a $V_1$ vector for direction, and speaker $S_2$ has a vector $V_2$ for direction, and position point X is a position in the environment.

$$S = \begin{bmatrix} | & | & | & \cdots & | \\ \vec{s}_1 & \vec{s}_2 & \vec{s}_3 & \ldots & \vec{s}_N \\ | & | & | & \cdots & | \end{bmatrix}. \quad \text{Equation 8}$$

$$V = \begin{bmatrix} | & | & | & \cdots & | \\ \vec{v}_1 & \vec{v}_2 & \vec{v}_3 & \ldots & \vec{v}_N \\ | & | & | & \cdots & | \end{bmatrix}. \quad \text{Equation 9}$$

$$\vec{x} = \langle x, y, z \rangle. \quad \text{Equation 10}$$

$$\vec{s_i} = \langle x_s, y_s, z_s \rangle. \quad \text{Equation 11}$$

$$\vec{v_i} = \langle x_v, y_v, z_v \rangle. \quad \text{Equation 12}$$

The Equation 10 is the position in space in the environment; Equation 11 is the position of speaker i in the environment; and Equation 12 is the unit vector for the direction of the speaker i.

Equation 7 can be parsed into three parts, where each part has a higher number for better coverage.

$$h(\vec{x}, S, V) = h_1(\vec{x}, S, V) + h_2(\vec{x}, S, V) + h_3(\vec{x}, S, V) \quad \text{Equation 13.}$$

The $h_1$ portion represents the x distance vector from each speaker; h2 represents how close the x distance vector is to the axis of the speaker (e.g., closer is higher number; and h3 represents the x distance vector is in the speaker dispersion pattern. The following equations are provided.

$$h_1(\vec{x}, S, V) = \sum_i \frac{1}{1 + \|\vec{x} - \vec{s}_i\|_2^2}. \quad \text{Equation 14}$$

$$h_2(\vec{x}, S, V) = \sum_i \frac{1}{\left\|(\vec{x} - \vec{s_i}) - proj_{\vec{v}_i}(\vec{x} - \vec{s_i})\right\|}. \quad \text{Equation 15}$$

-continued $$h_3(\vec{x}, S, V) = \sum_i -\tanh\left(\frac{2}{\theta_0}\left[\theta_0 - \cos^{-1}\left(\frac{\langle \vec{v_i}, (\vec{x} - \vec{s_i})\rangle}{\|\vec{v_i}\|\|\vec{x} - \vec{s_i}\|}\right)\right]\right). \quad \text{Equation 16}$$

In view of the foregoing, the total heatmap can be calculated as the sum of these expressions (e.g., sum of three expressions Equations 14, 15, and 16). When $h(\vec{x})$ is large, then the coverage in the area is good. A low number corresponds to poor coverage.

The heatmap can be used for optimizing speaker arrangement in an environment in order to provide better coverage and optimal audio object rendering. This can maximize the heatmap while minimizing how much each speaker is adjusted or moved. A room can include a speaker arrangement with "n" speakers, with each speaker "i" being located as point $x_i$. An audio object can be a distance $d_i$ from the speaker. Then a change of speaker location with a vector (e.g., $\vec{\Delta}_i$) can be calculated (e.g., for one or more speakers) to optimize speaker placement. The vector is the optimal change in speaker location that can be found with the following protocol.

The following equations are provided and can be used.

$$\max_{\Delta} \Sigma h_i(X+\Delta) - \|\Delta W\|_F^2 \quad \text{Equation 17.}$$

Here, $\|\Delta W\|_F^2$ is a penalty for moving speakers.

$$x = [\vec{x_1} \vec{x_2} \ldots \vec{x_n}] \quad \text{Equation 18.}$$

Here, $\vec{x_i}$ is location of speaker "i".

$$\Delta = [\vec{\Delta_1} \vec{\Delta_2} \ldots \vec{\Delta_n}]. \quad \text{Equation 19}$$

$$\Delta = \begin{bmatrix} | & | & | & \cdots & | \\ \vec{\delta}_1 & \vec{\delta}_2 & \vec{\delta}_3 & \cdots & \vec{\delta}_N \\ | & | & | & \cdots & | \end{bmatrix}. \quad \text{Equation 19A}$$

Here, $\vec{v_1} + \vec{x_1} = \vec{x_1}'$, which is a new speaker position.

$$W = \begin{bmatrix} w_1 & 0 & 0 & \ldots & 0 \\ 0 & w_2 & 0 & \ldots & 0 \\ 0 & 0 & w_3 & \ldots & 0 \\ \ldots & \ldots & \ldots & \ldots & \\ 0 & 0 & 0 & \ldots & w_N \end{bmatrix}. \quad \text{Equation 20}$$

Here, it is a weight for how much each speaker can move. The $h_i(x)$ (e.g., optionally assumed as convex) is a rolled out heatmap for speaker positioned at x. The Equation 17 covers cases when looking to adjust speaker positions.

Equation 19 or 19A can be used, which represents how much each speaker can be moved. Equation 20 weights the Matrix of Equation 19 or 19A so that each speaker can have different restrictions on how much the speaker can be moved. The $w_i$ in Equation 20 corresponds with the weight applied to $s_i$ (e.g., position of speaker i). The higher $w_i$, the less movement allowed for speaker $s_i$.

For optimization, Equation 21 can be used.

$$\max_{\Delta} \sum_{\vec{x} \in X} h_i(\vec{x}, S + \Delta, V) - \|\Delta W\|_F^2. \quad \text{Equation 21}$$

The optimization can include a protocol to find the best adjustments to maximize the heatmap. The, $\|\Delta W\|_F^2$ is a penalty that prevents too large of movements of the speakers. The equation can be solved using known iterative methods, such as gradient descent.

In some embodiments, the optimization of the speaker arrangement can be done by minimizing the variance of the heatmap that is generated. This minimization can make the audio coverage of the environment by the speaker system as evenly distributed as possible. However, other optimization protocols may also be used.

Figure 5A:
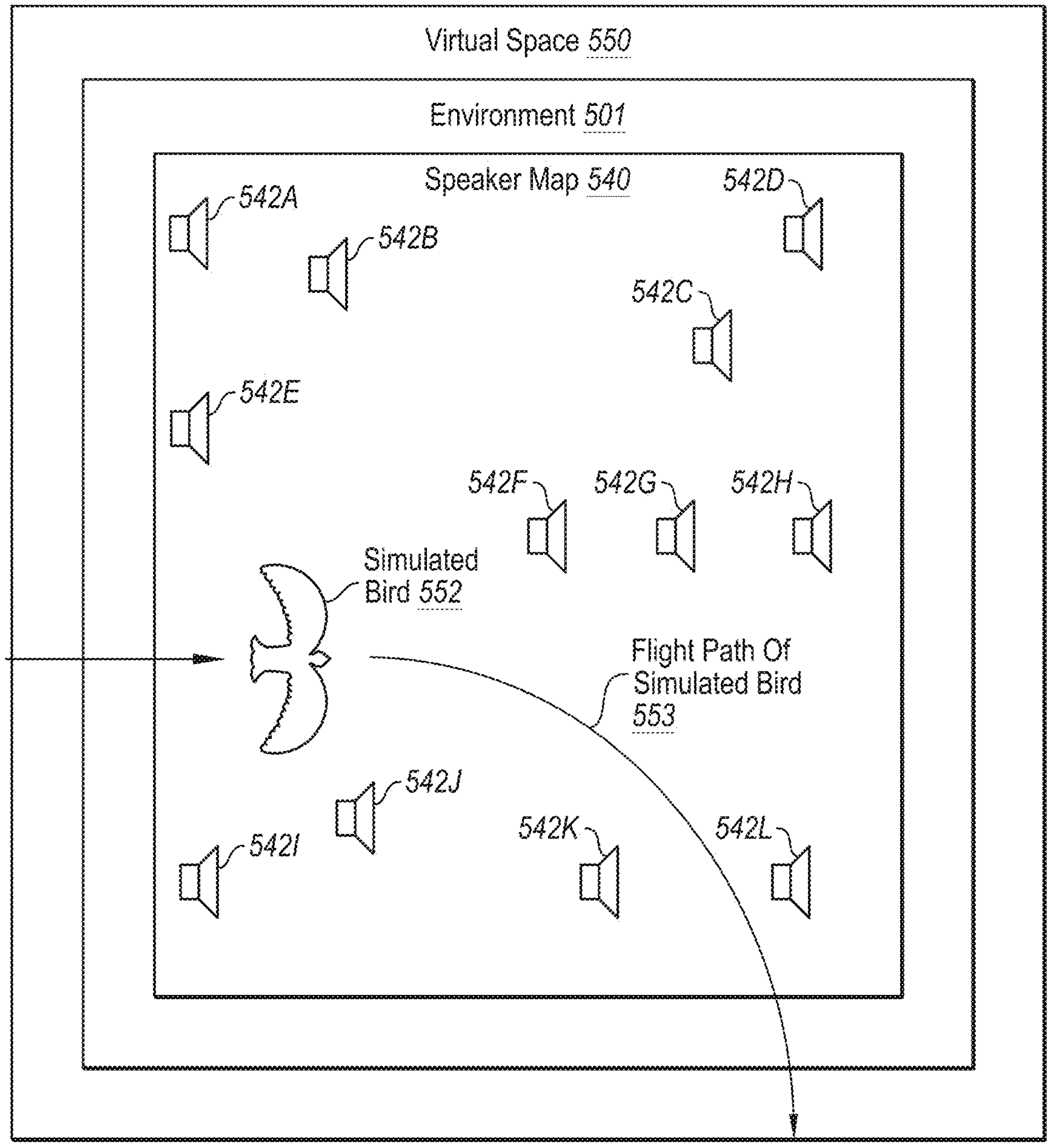
FIG. 5A is a top view of a virtual space with a speaker map.
Figure 5B:
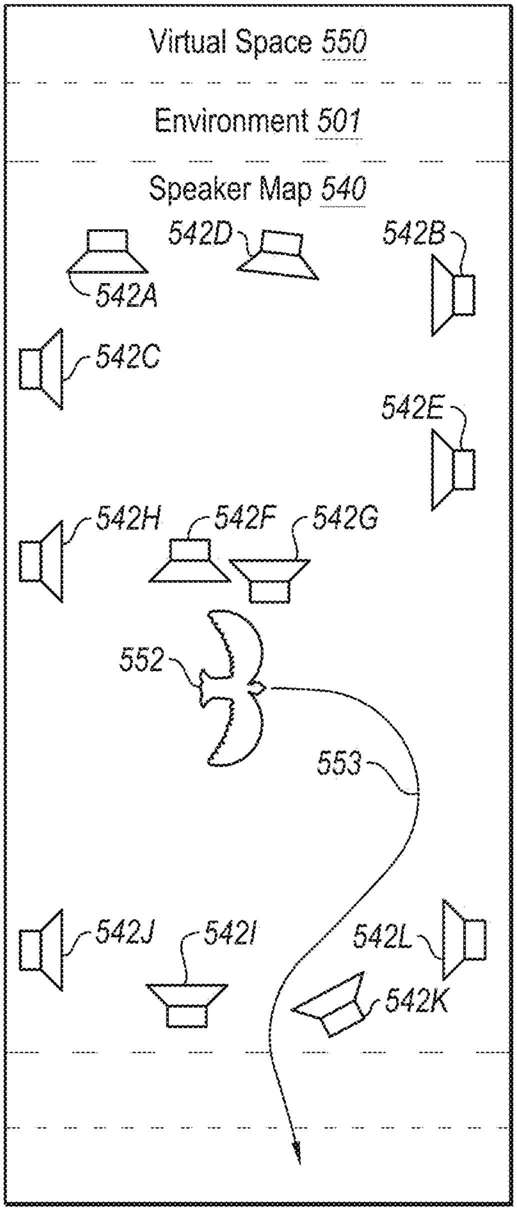
FIG. 5B is a side view of the virtual space and speaker map of FIG. 5A.

FIGS. 5A-5B show an environment 501 associated with a virtual space 550, and which has a speaker map 540 of a plurality of speakers 542A-542L. FIG. 5A shows a top-down view of the environment 501, and FIG. 5B shows a side view of the environment 501.

FIGS. 5A-5B together provide an illustration of an example 3D environment 501 in which an example audio system may operate and integrate with a virtual 3D space 550 ("virtual space 350") and a 3D speaker map 540 arranged in accordance with at least one embodiment described in this disclosure. FIGS. 5A-5B illustrate concepts that may be used in implementing the audio system and normalization of audio signals of this disclosure. For example, FIGS. 5A-5B illustrate one example of how the audio system might be configured to generate and/or adjust normalized audio signals for providing a consistently smooth audio object without volume spikes or rapid drop out based on the environment and the position of the speakers in the environment 501. FIGS. 5A-5B illustrate one example of how the audio system might be configured to generate unique normalized audio signals for one or more audio objects from one or more different speakers in the audio system.

In some embodiments information about the speakers 542A-542L and the environment 501 may be used when configuring the audio system for operation, when generating audio in the environment 501, and when adjusting the audio being generated. A speaker map 540 is an example of a conceptual way of organizing and representing the information that may be used in the configuration of the audio system, or in the generation and/or adjustment of normalized audio signals. The speaker map 540 may include information about the speakers 542A-542L of the audio system and information about the environment 501. In some embodiments the operational parameters may represent information about the environment 501 and the speakers 542A-542L without using the speaker map 540. In some embodiments the speaker map 540 may be included in operational parameters, which may be the same as, or similar to the operational parameters 120 of FIG. 1.

Figure 5C:
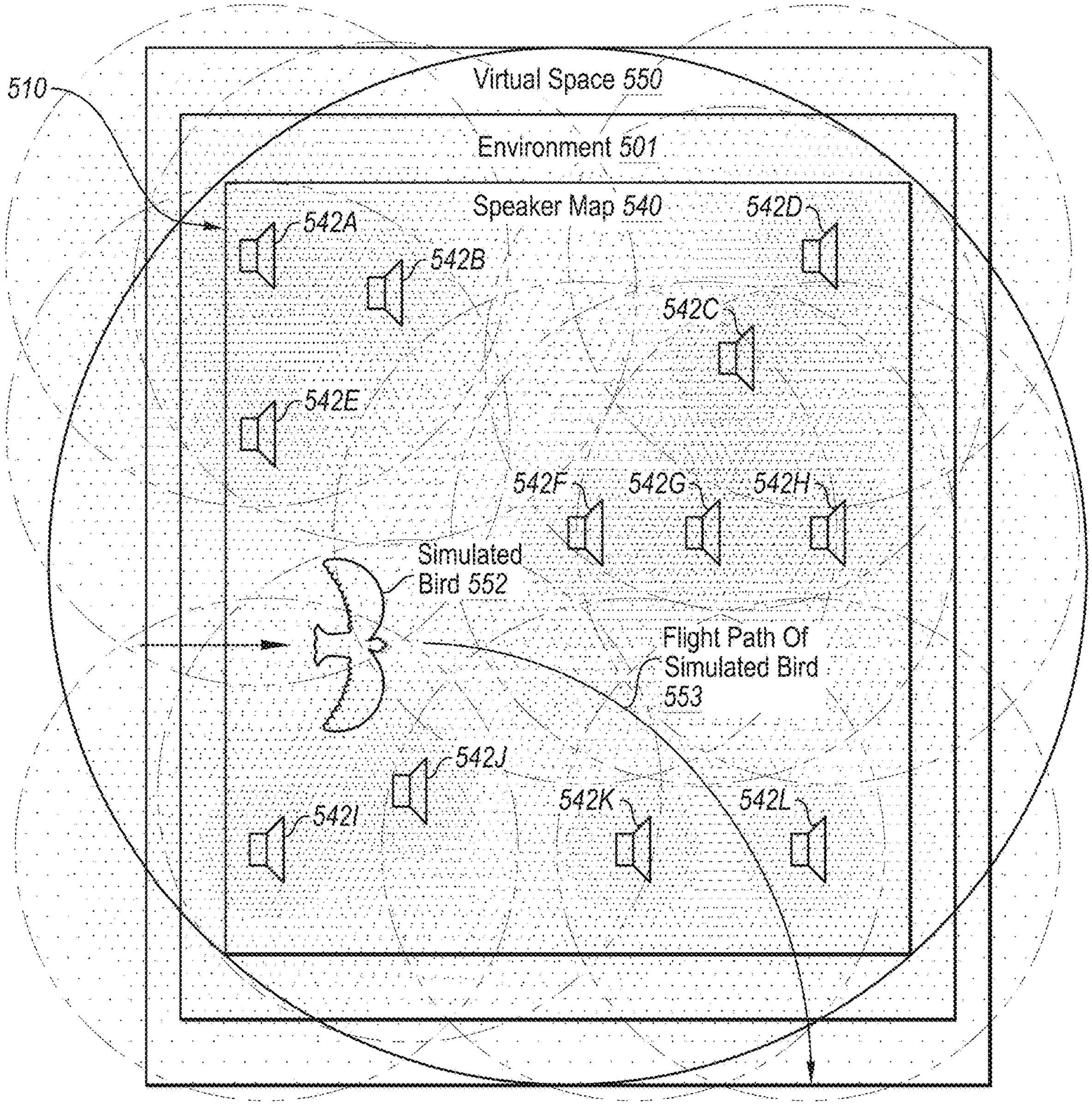
FIG. 5C is a top view of an audio heatmap for the virtual space and speaker map of FIG. 5A.

The speaker map 540 may be generated through a space characterization process. The space characterization process may be handled using a controller, such as the controller being configured as a computing system 160 of FIG. 1B. The space characterization process may be used to determine an accurate position and/or orientation of each of the speakers in the environment 501, and then generate an audio heatmap 510 as shown in FIGS. 5C (top-down view) and 5D (side view). The space characterization process may be used to determine characteristics of a space, such as locations of the ceiling, floor, and walls. The space characterization process can overly the audio heatmap 510 over the environment 501 and speaker map 540.

The space characterization process may also be used to determine audio deficiencies for each speaker resulting from placement/orientation constraints or physical aspects of the space. Example deficiencies may include speaker that may be partially obscured by an object, a speaker pointing away from the "center" of the space, a speaker positioned adjacent to a wall, a speaker placed facing a well, one or more hard surfaces causing reflections within the space, limited frequency response of a poor speaker, etc. The space characterization process may also be used to determine deficiencies in the speaker layout for the space, such as whether the speakers are placed too closely together, whether the speakers are placed too far apart, whether a desired type of sound projection with a layout may not be able to deliver (e.g., all speakers are on or near the ceiling making it difficult to achieve a 3D sound field, etc.). The space characterization process may be used to determine an overall characterization of the sound projection in the space, such as overhead sound, a wall of sound, surround sound, complete volume of sound, etc. Accordingly, the heatmap 510 can be generated by data obtained and calculated in the space characterization process.

In some embodiments, one or more speakers and one or more sensors (e.g., microphone, not shown) may be used in the space characterization process. In the present disclosure, space characterization may be referred to as obtaining acoustic properties of the environment. In some aspects, one or more speakers may generate a signal, such as, for example a ping signal, and transmit the signal into the environment. The ping signal may include electromagnetic radiation, such as, for example light or infrared light. Additionally or alternatively the ping signal may include sound, including sonic, subsonic, and/or ultrasonic frequencies. The ping signal may be transmitted into the environment. The ping signal may reflect off one or more physical objects in the environment, including for example, floors, wall, ceilings, and/or furniture. The ping signal may be received by one or more sensors. The transmitted ping signal may be compared with the reflected ping signal. The comparison may be used to generate acoustic properties of the environment. For example, a time of delay between the time of transmission and the time of reception may indicate a distance between the transmitter, which may be the speaker, a reflector, and the receiver which may be the sensor. For another example, the power of the reflected signal may indicate a degree to which the environment causes or allows sound to echo. For instance, if a speaker were to transmit a sound, and the sensor, which included a microphone were to receive the reflected sound at the same volume the acoustic property of the environment may indicate that the environment allowed echoes. Additionally or alternatively, if the microphone received multiple reflections of the reflected sound, the acoustic property of the environment may indicate that the environment allowed sounds to echo. In some embodiments the ping signal may be directed and/or scanned through the environment. In some embodiments the ping signal may include multiple ping signals at different times and/or at different frequencies. For example, a speaker may transmit a high-frequency ping signal to determine a high-frequency acoustic property of the environment; additionally or alternatively the speaker may transmit a low-frequency ping signal to determine a low-frequency acoustic property of the environment.

In some aspects, one or more speakers may generate a signal, such as, for example a frequency sweep. For example, the frequency sweep can be a sinusoid wave that is played that goes from 20 Hz to 20,000 Hz. Also, other sounds may be used.

The audio system of FIGS. 5A-5B may include a computing system (not illustrated) that may be the same as or similar to the computing system 160 of FIG. 1B. The computing system may be configured to control operations of the audio system such that the audio system may generate dynamic audio in the environment 501. The computing system may include an audio signal generator similar or analogous to the audio signal generator 100 of FIG. 1 such that the computing system may be configured to implement one or more operations related to the audio signal generator 100 of FIG. 1. In the present disclosure, the audio system generating one or more audio signals, and the speakers of the audio system providing audio based on the audio signals may be referred to as the audio system playing sound or the audio system playing audio data. In addition, reference to the audio system performing an operation may include operations that may be dictated or controlled by an audio signal generator such as the audio signal generator 100 of FIG. 1.

In some embodiments, the speaker map 540, which may include positions of one or more speakers, may be used in the configuration of the audio system and/or the generation of audio signals. For example, the speaker map 540 may include a first speaker 542A, a second speaker 542B, a third speaker 542C, a fourth speaker 542D, a fifth speaker 542E, a sixth speaker 542F, a seventh speaker 542G, an eighth speaker 542H, a ninth speaker 542I, a tenth speaker 542J, an eleventh speaker 542K, and a twelfth speaker 542L (collectively referred to as speakers 542 and/or individually as speaker 542). The speakers 542 may represent the locations of actual speakers of the audio system positioned in the environment 501.

Additionally or alternatively, the speaker map 540 may include speakers 542 which may be conceptual only. For example, one or more of the speakers 542 may be represented in the virtual space 550 as virtual speakers and may be included in the speaker map 540 accordingly. In these or other embodiments, the speaker map 540 may include a virtual speaker distribution in the virtual space 550 of the virtual speakers that represents locations of the virtual speakers in the virtual space 550. The locations in the virtual space 550 of the virtual speakers may represent the locations of one or more actual speakers in the environment 501 and/or potential locations of one or more speakers in the environment 501. The number of speakers may vary according to different implementations. In the present disclosure, general reference to "speakers" and the "speakers 542" may include actual speakers and/or virtual speakers that represent actual or potential speakers.

In these or other embodiments, the speaker map 540 may include properties of the speakers 542. For example, the speaker map 540 may include the size, and/or wattage as well as sound potential (e.g., sound gradient emitted from speaker, louder closer to speaker and tapering down as moving further away from speaker) of one or more speakers in the audio system. The speaker map 540 may include smart speakers. Additionally or alternatively the speaker map 540 may include analog speakers. A single audio system may include analog, digital, and/or smart speakers. The speaker map 540 may include the placement, direction, emission axis, maximum volume, or other characteristic of a speaker as described herein or generally known.

In some embodiments the speaker map 540 may include other features of the environment 501 which may affect sound in the environment 501, for example a wall, carpet, a doorway and or a street or sidewalk near the environment 501. The speaker map 540 may include actual distances between speakers 542 in the audio system and/or other features of the environment 501. The speaker map 540 may include a two, or three dimensional map of the environment 501 including representations of the speakers of the audio system in the environment 501. The maps of FIGS. 5A-5B may be represented as any 3D map or virtual or augmented representation in 3D.

As indicated above, the speakers of the speaker map 540 may include virtual speakers that represent actual and/or potential speakers of the audio system in the environment 501. A unique audio signal for each speaker 542 in the audio system may be generated. The generation of unique audio signals for each speaker 542 in the audio system may be based on the speaker map 540. For example, the speaker system may delay the playing of audio data for speakers in the audio system based on the distances between the speakers 542 in the speaker map 540. Further, the designation as to which audio data may correspond to which audio signal that may be received by which speaker 542 to obtain a particular audio effect may be based on the speaker map 540.

Including audio data in an audio signal that may be provided to and presented by a speaker may be referred to as causing a speaker to play the audio data, such as for rendering an audio object and/or audio scene. Further, because of the correspondence between speakers in the audio system, and speakers 542 in the speaker map 540, causing a speaker 542A to play audio data for an audio object may be synonymous with generating an audio signal for a speaker of the audio system that corresponds to the speaker 542A in the speaker map 540.

In some embodiments, one or more simulated objects (e.g., simulated bird 552), such as an audio object, may be used when generating audio for the environment 501, and when adjusting the audio being generated. As an example of a conceptual way of organizing and representing the simulated objects, some audio systems may use the virtual space 550. The simulated objects may be simulated in the virtual space 550 and may include a conceptual representation of an object that the audio system may use to generate or adjust audio in the environment 501.

The virtual space 550 may be overlaid onto the environment 501, such that the virtual space 550 represents space inside the environment 501. Additionally or alternatively the virtual space 550 may extend beyond or be detached from the environment 501.

The virtual space 550 may correspond to the speaker map 540 and/or the environment 501. Actual distance in the environment 501 may be reflected in the speaker map 540 and/or the virtual space 550. A point in the environment 501 may be represented in the speaker map 540 and the virtual space 550. Real objects in the environment 501 may be represented in one or both of the speaker map 540 and the virtual space 550. For example a wall, or a street near the environment 501 may have representation in both of the virtual space 550 and the speaker map 540.

The simulated objects (e.g., simulated bird 552) may include simulations of objects in the virtual space 550. The simulated objects can be audio objects that may have sound properties, location properties, and a behavior profile. The sound properties may represent indicators that may relate to certain audio data, or categories of audio data. Additionally or alternatively the sound properties may represent the manner in which the simulated object may affect sounds, for example, a wall that reflects sound. The location properties of the simulated object may include a single point, or multiple points or a path of multiple points in the virtual space 550. Additionally or alternatively the location properties of the simulated object may extend through the virtual space 550. The location properties of the simulated object may be constant, or the location properties of the simulated object may change over time. The behavior profile of the simulated object may govern the manner in which the simulated object behaves over time. The behavior of the simulated object may be constant, or the behavior of the simulated object may change over time, based on a random number, or in response to a condition of the environment 501.

In these or other embodiments, the simulated objects may be depicted in the virtual space 550 as a node that occupies an area within the virtual space 550. For example, based on audio data that corresponds to a particular object, the audio system may generate a node for the virtual space 550 that corresponds to the particular object. In these or other embodiments, the node may be disposed in a particular area of the virtual space according to a behavior profile of the particular object and/or a user input, which in some embodiments may be used to help define the behavior profile. Additionally or alternatively, a respective node that corresponds to a respective object may be represented as moving through the virtual space 550 according to the behavior profile of the respective object.

An example of a simulated object, a particular simulated object may represent a simulated bird 552, which may represent, for example, a European swallow. The simulated bird 552 may have a single point location in the virtual space 550 for each time unit in real time. Also, the behavior profile of the simulated bird 552 may indicate that the location of the simulated bird 552 changes over time in real time as the simulated bird 552 traverses a simulated flight path 553. Thus, the flight path of simulated bird 552 may represent a path through the virtual space 550 to be taken by the simulated bird 552 and the rate at which the simulated bird 552 may cross the flight path of simulated bird 552. Additionally or alternatively the flight path of simulated bird 552 may represent the location of the simulated bird 552 as a function of time.

Because simulated objects may move through the virtual space 550, which corresponds to the speaker map 540, audio data relating to simulated objects may be played at different speakers over time. For example, referring to the simulated bird 552, and the flight path of simulated bird 552, audio data of the simulated bird 552 in flight may be designated for presentation by different speakers as the simulated bird 552 crosses the virtual space 550. The audio data may be designated for more than one speaker at the same time. Additionally or alternatively, audio data designated for two speakers may indicate that the audio data is presented by the two speakers at different volumes. For example audio data may be designated for presentation at a first speaker at a volume, which may increase over time, then the audio data may be designated for presentation by the first speaker at a volume that decreases over time. And, while the audio data is being designated for presentation at a decreasing volume at the first speaker, the same audio data may be designated for presentation at a second speaker at a volume that increases over time. This may give the impression that the simulated object is moving through the environment 501.

In these or other embodiments, normalization protocols can be performed so that the normalized audio signals allow the speakers 542 to cooperatively render the audio object with consistently smooth sound that reduces volume peaks or rapid dropout. For example, referring to FIGS. 5A-5B, the speakers of the audio system corresponding to the speaker 542E, the speaker 542F, the speaker 542G, the speaker 542I, the speaker 542J, the speaker 542K and the speaker 542L may be designated to play audio data of the simulated bird 552 in flight path 553. Specifically, the speakers of the audio system corresponding to the speaker 542E and the speaker 542I may be designated to play the audio data of the simulated bird 552 in flight first. Based on knowing that the airspeed velocity of an unladen European swallow may be 11 meters per second, the speakers of the audio system corresponding to the speaker 542E and the speaker 542I may be designated to play the audio data of the simulated bird 552 for only a short time. The short time may be calculated from the airspeed velocity of the simulated bird 552 and the distance between speakers in the speaker map 540. Then the speaker of the audio system corresponding to the speaker 542J may be designated to play the audio data of the simulated bird 552 in flight. Then the speaker of the audio system corresponding to the speaker 542F may be designated to play the audio data of the simulated bird 552 in flight. Then the speakers of the audio system corresponding to the speaker 542G and the speaker 542K may be designated to play the audio data of the simulated bird 552 in flight. Last, the speakers of the audio system corresponding to the speaker 542K and the speaker 542L may be designated to play the audio data of the simulated bird 552 in flight. This may give a person in the environment 501 the impression that a European swallow has flown through or over the environment 501 at 11 meters per second. The changing of the audio signals being designated for the speakers as the simulated bird 552 traverses the virtual space 550 may be an example of dynamic audio.

Additionally or alternatively the behavior profile of the simulated bird 552 may allow for multiple instances of the simulated bird 552 to traverse or be in the virtual space 550 at any given time. The changing of the audio signals designated for the speakers as the simulated bird 552 traverses the virtual space 550 in changing ways or at random or pseudo-random intervals may be an example generating the audio signals based on random numbers, which may be an example of dynamic audio. The heatmap 510 of FIGS. 5C-5D can be used to identify optimal flight paths so that the rendered audio object has consistently smooth sound without volume spikes or dropout, such as by optimizing the accuracy of the audio object through the normalization protocol.

In some embodiments, the behavior profile of the simulated bird 552 may indicate that the simulated bird 552 may stop in the environment for a time. The simulated bird 552 may have sound properties including audio data related to flight and audio data related to stationary behaviors, such as, for example chirping, tweeting, or singing a birdsong. So, a behavior profile may indicate that the audio system compose audio data related to the simulated bird 552 in flight path 553 into an audio signal to be played at some speakers. Then, later, the behavior profile may indicate that the audio system compose audio data related to the simulated bird 552 at rest into an audio signal to be provided to some speakers. Then later the behavior profile may indicate that the audio system compose audio data related to the simulated bird 552 in flight into an audio signal to be played at some speakers. The changing audio signals being played by the speakers over time as a result of the behavior profile of a simulated object may be an example of dynamic audio.

Figure 5D:
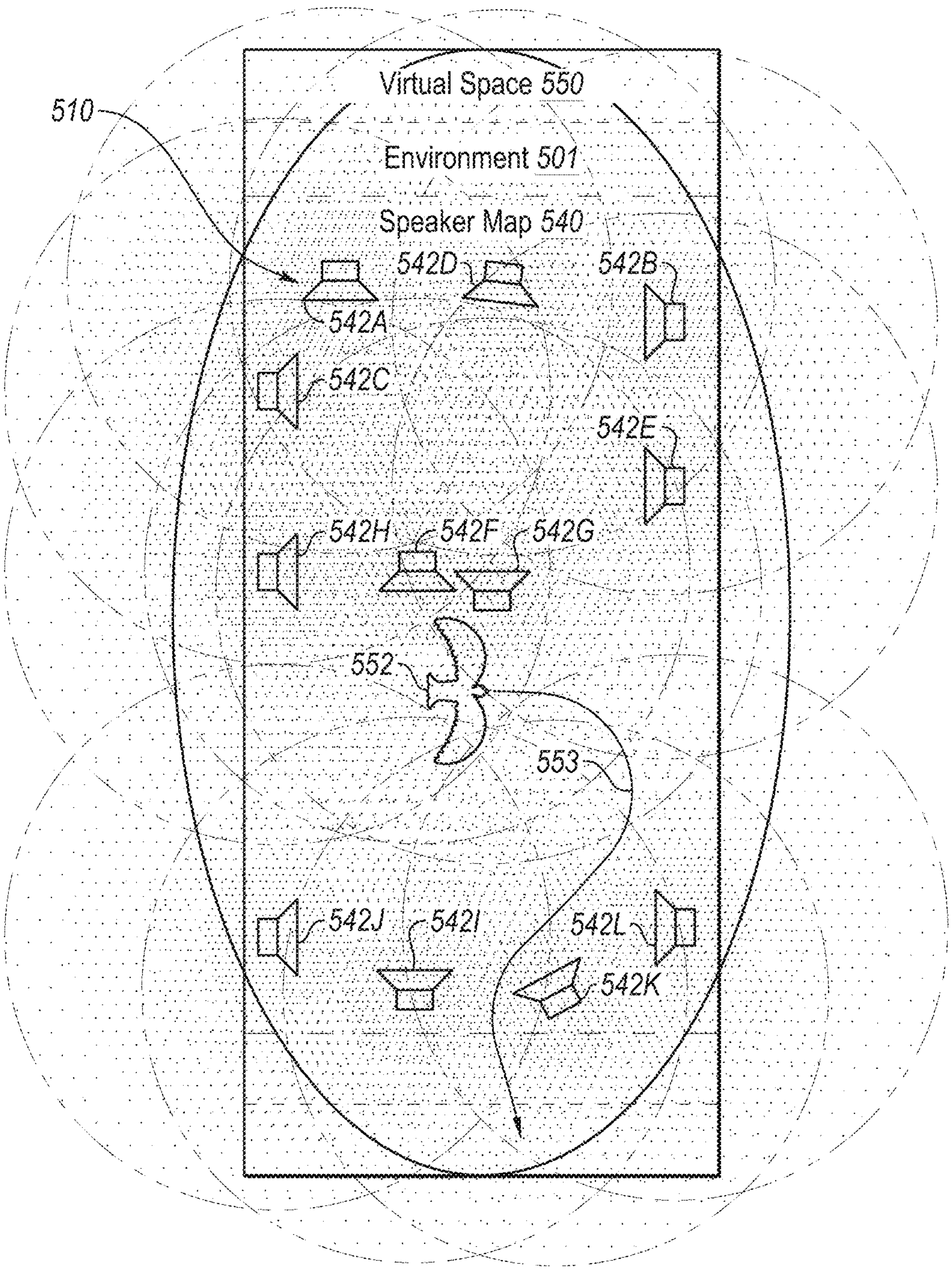
FIG. 5D is a side view of the audio heatmap corresponding to FIG. 5B.

FIG. 5C shows the view of the audio heatmap 510 for the speaker map 540 of FIG. 5A. FIG. 5D shows the view of the audio heatmap 510 for the speaker map 540 of FIG. 5B. The heatmap 510 stays the same as long as the speaker map 540 does not change. The heatmap 510 overlaid over the speaker map 540 provides the data for use in the normalization protocol.

The heatmap 510 can be used for calculating the potential a values or accuracies for each location of the audio object, and may also determine the locations with low accuracies or inaccuracies. The ability of a sound of an audio object to be rendered in each location in the environment 501 can be determined with the heatmap 510.

In instances that the heatmap 510 has one or more deficiencies in accuracy of rendering an audio object, which may be due to too many speakers in a given area (e.g., high speaker density) or too few speakers in a given area (e.g., low speaker density), the speaker arrangement and distribution can be manually changed. That is, the speakers can be relocated, repositioned, or reoriented. Then, a new audio heatmap can be generated. The heatmap 510 can be manipulated, such as with the computing system and with or without an operator (e.g., person), to smooth out to steep of sound gradients, reduce over coverage (decrease density) or reduce under coverage (increase density). The computing system can then relocate, reposition, or reorient one or more speakers 542 in the speaker map 540 so that the real speakers 542 can be repositioned in the environment 501. The new heatmap 510 can then be confirmed by manually generating the heatmap for the new speaker map 540. The position and direction of each speaker along with the speaker properties (e.g., frequency response) can be used in calculating the heatmap 510.

As shown, the heatmap 510 illustrates the ability of the speakers to accurately render the audio objects with consistently smooth sound without volume spikes and rapid dropout. Additionally, the heatmap 510 shows locations having an overly dense speaker distribution. As a result, tuning the audio system may include moving speakers further apart, removing speakers, changing direction, or otherwise decreasing speaker density. The heatmap 510 can be regenerated as often and as needed between different speaker distributions, and an iterative protocol can be performed for optimizing speaker distribution.

Similarly, the heatmap 510 shows locations having sparse speaker distribution. As a result, tuning the audio system can include moving speakers closer together, adding speakers, or changing direction, or otherwise increasing speaker density. The heatmap 510 can be regenerated as often and as needed between different speaker distributions, and an iterative protocol can be performed for optimizing speaker distribution. It should be recognized that the tuning protocol can include both some regions having speaker density decreased while other regions are having the speaker density increased. The optimization protocols described herein can be used for tuning and improving speaker density for better coverage.

The heatmap 510 can also be used to map audio content to the speaker map 540 so that the locations of rendering of audio objects can be identified and choreographed with respect to the environment 501 and with respect to each other. The normalization protocol (e.g., dynamic normalization) can be used to identify the output capability of each speaker with respect to each audio object, which is exemplified in the heatmap 510. The heatmap 510 thereby provides a visual representation of the effectiveness for the speakers in the set distribution to render audio object, and render groups of a plurality of audio objects. The heatmap 510 thereby can identify regions where an audio object may not render properly, and thereby move the audio object to a different position or along a different path so that non-rending regions can be avoided and suitable rendering regions can be utilized. For example, some non-rendering regions may be flagged to have minimal or no audio objects. In some low-rendering regions, content can be identified that can be suitably rendered by the sparse speaker density. This allows for selectively adapting audio content for regions with low rendering effectiveness. The content or playback or rendering of an audio object may be adjusted in real time for regions with low speaker density, and thereby low $\alpha$ value or low accuracy. For example, the system can query a user or installer human whether to adapt the content for the environment, or the system can make automatic adaptations (e.g., based on the heatmap).

As shown in FIGS. 4A-4D, 5C, and 5D, the heatmap may be shown as a visual representation, such as a visual representation overlaid over the speaker map. The heatmap may also be an augmented reality object overlaid over the speaker map or over any map of the environment with or without the location of the speakers being visually identified. The heatmap can use a color mapping to distinguish between high density regions and low density regions, such as the high sound density being dark and the low sound density being light, or vice versa. The color mapping may use any colors or color combinations, or may use greyscale, stipple density, or other visual indicator that can distinguish between high density regions from low density (e.g., sparse) regions. In some aspects, the high density regions can be flagged in some way with a visual marker, such as different coloring or a tag (e.g., shape such as an "X"). Similarly, low density regions can be also flagged or marked with a visual marker.

Generally, the audio systems can perform to provide scenes in a manner as described in U.S. Pat. No. 10,291,986, which is incorporated herein by specific reference in its entirety. For example, the scenes may contain sound audio objects that move with behaviors defined either in a simple declarative manner, a hybrid declarative and software scripted manner, or under fully scripted control. Scenes and audio objects within the scenes may include input and output parameters that allow for a dataflow to occur in to, out of and throughout the collection of objects that make up a scene.

An audio object may include a local coordinate space with sounds at positions relative to that local coordinate space. Audio objects can be organized into hierarchies with sub-objects. Each audio object can also have an associated set of scripts that may define behaviors for the audio object. These behaviors may generate motion paths that govern how the object moves in the coordinate system, such as when to move and how to select from a potential set of sounds emitted by the object, among others.

Example adjustable audio object properties may include name, transform, position, orientation, volume, mute, priority, bounds, path, type (linear, curve, circle, scripted), velocity, mass, acceleration, points, orient, loop, delay, motion, among others.

Scripts may be expressed in various formats, such as Lua, and may be used to create behaviors more sophisticated than simply motion along a path. Scripts may also be used to handle incoming or outgoing data through the environment. Different scripts may be called at different times. In at least one embodiment, scripts may use a shared variable space. Having a shared space may allow scripts that execute at different times—and potentially for different purposes—to exchange information through the shared variables. Scripts, for example, can reference objects and the scene via a dotted namespace. Further, each speaker may include a local script engine to execute one or more scripts. Additionally or alternatively, two or more speakers may include a distributed script engine that is distributed among the two or more speakers. Whether local or distributed, the script engine(s) may control audio output within the environment.

Scenes, audio objects and audio streams may be referenced via standard Internet Uniform Resource Locators (URLs), which enables these references to be stored on a Web Server. Real time or near-real time continuous audio streams may also be referenced using URLs.

Referring back to the figures, the audio system can include a plurality of speakers positioned in a speaker arrangement in an environment and an audio signal generator operably coupled with each speaker of the plurality of speakers. The audio signal generator, which can be embodied as a computer, is configured (e.g., includes software for causing performance of operations) to provide a specific audio signal to each speaker of a set of speakers to cause a coordinated audio emission from each speaker in the set of speakers to render an audio object in a defined audio object location in the environment. The audio signal generator is configured to process (e.g., with at least one microprocessor) audio data that is obtained from a memory device (e.g., tangible, non-transient) for each specific audio signal. The audio signal generator is configured to analyze each specific audio signal based on the audio data in view of the speaker arrangement in the environment, and then to determine the specific audio signals for each speaker in the speaker set to render the audio object in the defined audio object location. The audio signal generator includes at least one processor configured to cause performance of operations, such as the following operations described herein. The system can identify the audio object and the defined audio object location in the environment, and obtain audio data for the audio object so that it can be rendered at the defined location. The system can identify the set of speakers to render the audio object at the defined audio object location, and then generate at least one specific audio signal for each speaker of the set of speakers to render the audio object at the defined audio object location. In some instance, the system can determine the at least one specific audio signal for at least one speaker in the set of speakers to be insufficient to render the audio object at the defined audio object location. The insufficiency of the audio object may be that the volume is too low, the volume oscillates, the volume is too high, the volume spikes, the volume drops out, the rendering is intermittent, or others. Accordingly, the rendering of the audio object being insufficient is based on the at least one specific audio signal for the at least one speaker of the set of speakers causing a volume of the audio object to cause the insufficiency, such as having a volume spike or dropout or other insufficiency. When there is an insufficiency in the rendering of the audio object, the system can normalize the at least one specific audio signal for the at least one speaker based on speaker density of the set of speakers and volume of the rendered audio object at the defined audio object location to obtain at least one normalized specific audio signal for the at least one speaker. The system can provide the at least one normalized specific audio signal to the at least one speaker, and the set of speakers can render the audio object at the defined audio object location with a volume that is devoid of volume spikes or dropout. The audio system can be used to perform methods of normalizing an audio signal for rendering an audio object. The methods can use the heatmap for normalizing of the audio signals or the data, in order to provide the normalized audio signal so that the audio object can be properly rendered at a defined location without volume spikes or dropout.

Further, in relation to a virtual space, such as the virtual space 550 of FIGS. 5A-5D, the audio system may be configured to designate that certain rendered audio signals be designated for certain virtual speakers as part of a representation of presentation of the corresponding audio in a corresponding environment that may be represented by the virtual space. In these or other embodiments, such functionality may be leveraged to simulate presentation of such audio outside of the physical space that may be represented by the virtual space. For example, such functionality may be used to integrate an audio localization environment with the virtual space such that the audio localization environment may be used to simulate presentation of audio as it may be perceived in the physical space.

Figure 6:
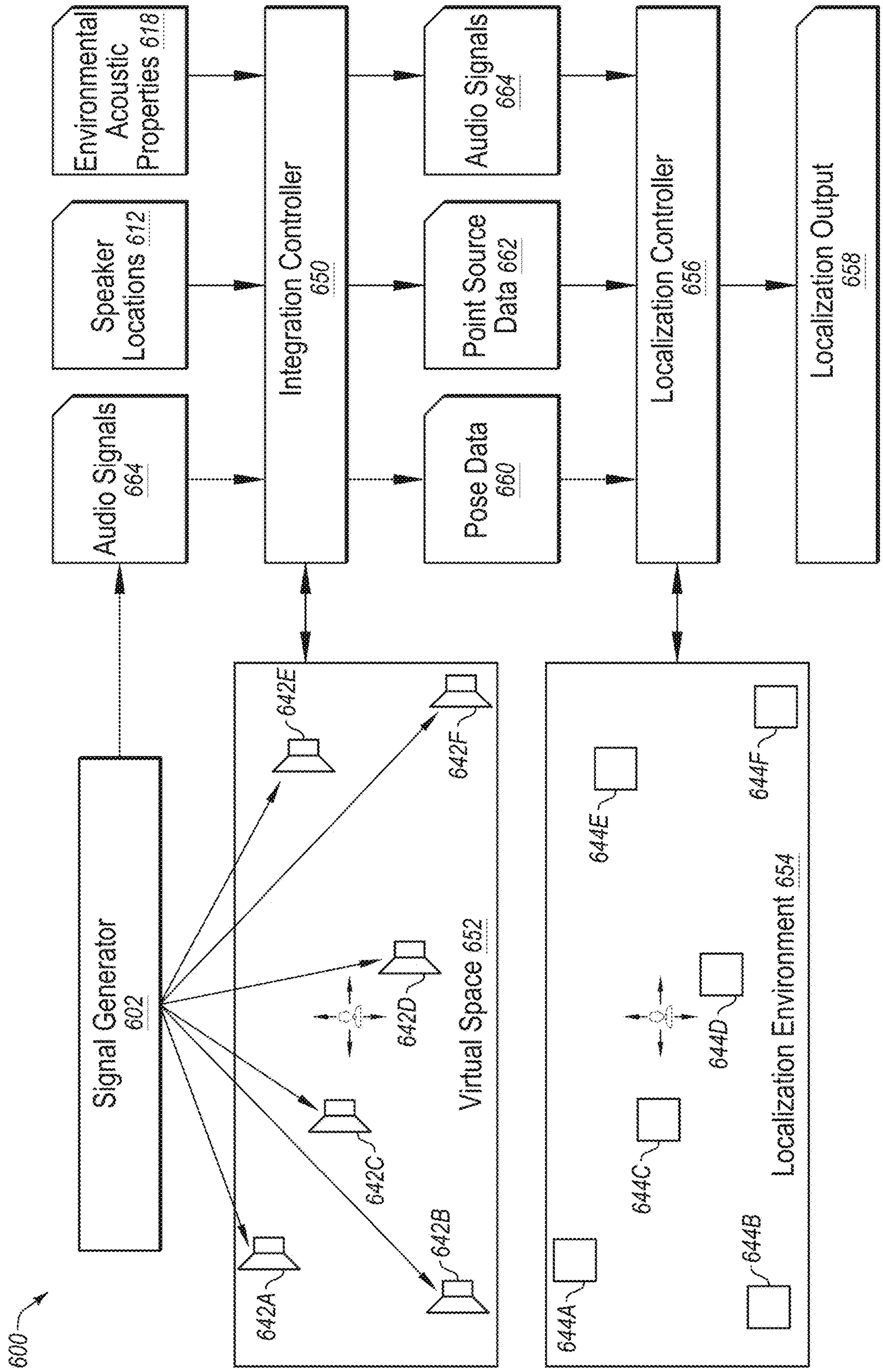
FIG. 6 illustrates an example system 600 that is configured to integrate an audio system such as that described herein with an audio localization environment.

For instance, FIG. 6 illustrates an example system 600 that is configured to integrate an audio system such as that described herein with an audio localization environment, according to one or more embodiments of the present disclosure. In some embodiments, the system 600 may include a signal generator 602, an integration controller 650, and an audio localization controller 654 ("localization controller 654").

The signal generator 602 may be analogous to the signal generator 100 described with respect to FIG. 1A. As such, the signal generator 602 may be configured to generate audio signals designated for playback by a plurality of speakers according to a configuration (e.g., placement, number, type, etc.) of the speakers in a particular environment and/or according to characteristics of such an environment, such as described above. In some embodiments, the signal generator 602 may be included in and/or implemented by a computing system such as the computing system 160 of FIG. 1B.

The integration controller 650 may include any suitable system, apparatus, or device configured to integrate a virtual space 652 with a localization environment 654. For example, the integration controller 650 may include code and routines configured to enable a computing system to perform one or more operations to generate and/or manage the virtual space 652. Additionally or alternatively, the integration controller 650 may be implemented using hardware including a processor, a microprocessor (e.g., to perform or control performance of one or more operations), an FPGA, an ASIC, or any other suitable system or device configured to perform processing operations. In these or other embodiments, the integration controller 650 may be implemented using a combination of hardware and software. In the present disclosure, operations described as being performed by the integration controller 650 may include operations that the integration controller 650 may direct a corresponding system to perform. In some embodiments, the integration controller 650 may be included in and/or implemented by a computing system such as the computing system 160 of FIG. 1B.

The virtual space 652 may be analogous to the virtual space 550 of FIGS. 5A-5D. The virtual space 652 may accordingly represent a particular physical environment. Additionally or alternatively, the virtual space 652 may represent a simulated environment. In these or other embodiments, the virtual space 652 may include virtual speakers 642 (illustrated as speakers 642A-642F), which may represent speakers that may be included in the particular physical environment. As indicated above, the virtual speakers 642 may represent speakers actually included in the physical environment and/or potential speakers to include in the physical environment. In these or other embodiments, the virtual speakers 642 may be distributed within the virtual space 652 according to a speaker map similar or analogous to the speaker map 540 of FIGS. 5A-5D.

In some embodiments, the integration controller 650 may be configured to generate the virtual space 652 and/or a corresponding speaker map using information that may be used by the signal generator 602 to generate audio signals. For example, the integration controller 650 may be configured to render the virtual space 652 and/or determine a corresponding speaker map based on one or more of: speaker locations 612 and environmental acoustic properties 618. The speaker locations 612 may include information similar or analogous to the speaker locations 112 described above with respect to FIG. 1A. For example, in embodiments, the speaker locations 612 may include the locations of actual speakers already disposed in the environment. Additionally or alternatively, the speaker locations 612 may include potential or proposed locations of speakers in the environment.

In these or other embodiments, the integration controller 650 may be configured to obtain other properties about the environment that may be represented by the virtual space 652. For example, the integration controller 650 may be configured to obtain environmental acoustic properties 618 about the environment that may be similar or analogous to the environmental acoustic properties 118 of FIG. 1A. In these or other embodiments, the integration controller 650 may render the virtual space 652 to represent one or more of the environmental acoustic properties 618.

The localization controller 656 may include any suitable system, apparatus, or device configured to generate audio localization based audio signals 658 ("localization signals") such as described in further detail below. For example, the localization controller 656 may include code and routines configured to enable a computing system to perform one or more operations to generate the localization signals. Additionally or alternatively, the localization controller 656 may be implemented using hardware including a processor, a microprocessor (e.g., to perform or control performance of one or more operations), an FPGA, an ASIC, or any other suitable system or device configured to perform processing operations. In these or other embodiments, the localization controller 656 may be implemented using a combination of hardware and software. In the present disclosure, operations described as being performed by the localization controller 656 may include operations that the localization controller 656 may direct a corresponding system to perform. In some embodiments, the localization controller 656 may be included in and/or implemented by a computing system such as the computing system 160 of FIG. 1B.

The localization controller 656 may be configured to generate the localization signals in a manner that synthesizes a binaural sound that seems to come from a particular point in space. For example, in some embodiments, the localization controller 656 may be configured to generate the localization signals using a head-related transfer function (HRTF) that describes how a sound from a specific point will arrive at the ear (generally at the outer end of the auditory canal). The localization controller 656 may be configured to generate the localization signals according to any other suitable technique or process as well. In these or other embodiments, the localization signals may be configured for playback by a set of stereo headphones to generate a simulated sound effect.

In these or other embodiments, the localization controller 656 may generate the localization signals based on one or more point sources that may be included in an audio localization environment 654 ("localization environment 654"). The localization environment 654 may simulate audio that may be present in an environment. Further, the point sources may represent locations within the environment from which sound may emanate. In these or other embodiments, the localization controller 656 may be configured to generate the localization signals such that if a person were within the environment simulated by the localization environment 654, sound associated with a particular point source would be perceived by the person as deriving from the location of the particular point source. In some embodiments, the localization controller 656 and the localization environment 654 may be considered as being part of a same audio localization system.

Additionally or alternatively, the localization controller 656 may be configured to obtain as input, listener pose data 660 of a person within the localization environment 654 to generate the corresponding sound effects. In these or other embodiments, the pose data 660 may include information related to a simulated position and/or orientation of a person within the localization environment 654.

For example, a person standing at one location facing one direction may receive sound emanating from a particular point source differently than a person standing at another location facing in the same or a different direction. As such, in order to generate localization signals to generate audio that is perceived as if it is emanating from a particular point source, a simulated position/and or orientation within the simulated environment may also be obtained from the pose data 660 and used by the localization controller 656 to generate the localization signals.

In these or other embodiments, the integration controller 650 may be configured to map the virtual space 652 to the localization environment 654. For example, the virtual speakers 642 may be indicated as respective point sources 644 in the localization environment 654. In particular, the integration controller 650 may provide to the localization controller 650 point source data 662 that indicates a distribution of point sources in the localization environment. For example, the point source data 662 may include a number of point sources and respective positions and orientations of the point sources to include in the localization environment 654. The point source distribution included in the point source data 662 may have the same distribution (e.g., number, position, orientation, etc.) as the virtual speakers 642 in the virtual space 652. The localization controller 656 may accordingly use the point source data 662 to include point sources 644 in the localization environment 654 that correspond to the virtual speakers 642 and that have the respective positions and orientations of their corresponding virtual speakers 642. For example, the localization environment 654 may include point sources 644A, 644B, 644C, 644D, 644E, and 644F that respectively correspond to virtual speakers 642A, 642B, 642C, 642D, 642E, and 642F, 642B, 642C, 642D, 642E, and 642F.

In these or other embodiments, the indicating of the virtual speakers 642 as point sources 644 of the localization environment 654 may help integrate the audio system that corresponds to the signal generator 602 with the localization environment 654 in a manner that allows for simulating audio objects and/or scenes that may be generated by the signal generator 602. For example, the signal generator 602 may be configured to generate audio signals 664 for a particular audio scene based on parameters associated with the virtual space 652 such as described above (e.g., the speaker map of the virtual speakers 642, environmental parameters associated with the physical environment represented by the virtual space 652, etc.). Additionally or alternatively, the signal generator 602 may be configured to accordingly designate certain audio signals 664 for certain virtual speakers 642 according to the rendered audio scene.

The audio signals that may be designated for the respective virtual speakers 642 may be designated for the respective point sources 644 of the localization environment 654 that are mapped to the virtual speakers 642. Accordingly, during rendering of the audio scene, the signal generator 602 may provide the corresponding audio signals for "playback" by the corresponding virtual speakers 642. In some embodiments, the audio signals provided for the virtual speakers 642 may be received by the integration controller 650 from the signal generator 602. Additionally or alternatively, the integration controller 650 may pass the audio signals 664 to the localization controller 656 according to the correspondences between the virtual speakers 642 and the point sources 644 of the localization environment 654.

For example, the integration controller 650 may determine that a first audio signal that is provided for playback by the virtual speaker 642A is to be used as audio emitted by the point source 644A of the localization environment 654 that corresponds to (e.g., is mapped to) the virtual speaker 642A. The integration controller 650 may accordingly pass the first audio signal to the localization controller 656 in a manner that designates the first audio signal as corresponding to the point source 644A.

In these or other embodiments, the integration controller 650 may be configured to provide pose data 660 to the localization controller 656. As indicated above, the pose data 660 may include position and/or orientation information within the virtual space 652 that corresponds to a simulated position and/or orientation of a person within the environment represented by the virtual space 652.

The localization controller 656 may be configured to generate an audio localization output 658 ("localization output") based on the received audio signals 664, the pose data 660, and the point source data 662. For example, as indicated above, the point source data 662 may indicate the locations and/or orientations of the point sources 644 in the localization environment 654 that may correspond to locations and/or orientations of the virtual speakers 642 in the virtual space 652. As also indicated above, the audio signals 664 may include an indication as to which point sources 644 the audio signals 664 are designated. The localization controller 656 may accordingly generate localization signals to be included in the localization output 658 such that when presented via a particular stereo setup (e.g., stereo headphones), the audio that corresponds to the audio signals 664 is perceived as being from the positions in an actual environment of speakers that correspond to the virtual speakers 642 from the perspective of a person positioned and oriented in the actual environment according to the pose data 660. As also indicated above, the audio signals 664 may also be configured to simulate an audio object and/or audio scene when presented by speakers that are distributed in a physical environment represented by the virtual space 652 according to the virtual speaker distribution. Accordingly, the localization output 658 may simulate an audio experience of a person in an environment that may correspond to the virtual space 652 without the person actually being in such an environment.

Modifications, additions, or omissions may be made to FIG. 6 without departing from the scope of the present disclosure. For example, in some embodiments, the operations described with respect to the signal generator 602, the integration controller 650, and/or the localization controller 656 may be performed by a same system or broken up differently than described. The delineation and separation described herein is to provide ease of explanation of concepts. Also, although the above description is with respect to a localization controller configured to synthesize a binaural sound for playback by a set of stereo speakers, the same principles may apply for any other suitable audio localization system configured to synthesize a sound for playback by multiple speakers to simulate sound coming from a certain location in an environment with respect to a person being positioned in a particular location in such environment.

Figure 7:
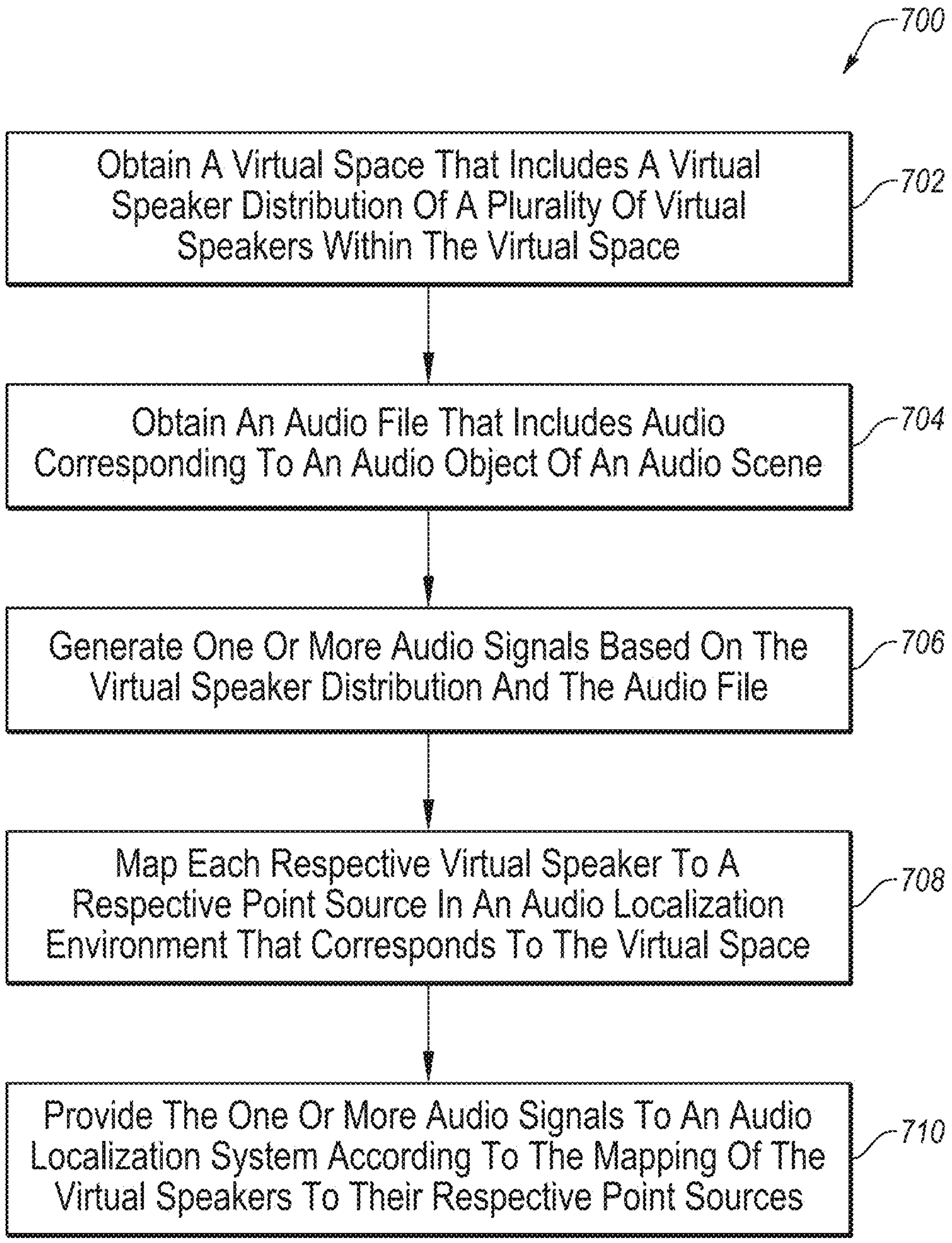
FIG. 7 is a flowchart of an example method of integrating an audio localization environment with an audio system.

FIG. 7 is a flowchart of an example method 700 of integrating an audio localization environment with an audio system, according to one or more embodiments of the present disclosure. The method 700 may be performed by any suitable system, apparatus, or device. By way of example, one or more of the operations of the method 700 may be performed by one or more of: the signal generator 602, the integration controller 650, or the localization controller 656 of FIG. 6. Additionally or alternatively, the computing system 160 of FIG. 1B (e.g., as directed by one or more controllers or modules in some embodiments) may perform one or more of the operations associated with the method 700. Although illustrated with discrete blocks, the steps and operations associated with one or more of the blocks of the method 700 may be divided into additional blocks, combined into fewer blocks, or eliminated, depending on the particular implementation.

The method 700 may include a block 702 at which a virtual space may be obtained. The virtual space may be a representation of a physical environment in some embodiments. The virtual space may include a virtual speaker distribution of one or more virtual speakers within the virtual space. In some embodiments, the virtual speaker distribution may be indicated by a speaker map, such as the speaker map 540 described above. In these or other embodiments, the virtual space may be obtained based on speaker locations, such as the speaker locations 112 or 612 described above. In these or other embodiments, the virtual space may include environmental acoustic properties such as the environmental acoustic properties 118 and 618 described above. In these or other embodiments, obtaining the virtual space may include being provided the virtual space representation as some sort of input. In these or other embodiments, obtaining the virtual space may include generating the virtual space such as based on obtained speaker locations and/or environmental acoustic properties.

At block 704, one or more audio files may be obtained. The audio files may include respective audio that may correspond to one or more respective audio objects in some embodiments.

At block 706, one or more audio signals may be generated based on the audio file and based on the distribution of the virtual speakers. The audio signals may be generated such that presentation of the audio signals by speakers within the physical environment that may be represented by the virtual speakers produces respective audio in a manner that simulates one or more audio objects in the physical environment.

By way of example, in some embodiments, the signal generators 102 or 602 discussed above may generate the audio signals in a manner such as described above. Additionally, it is noted that reference to generation of the audio signals "based on the distribution of the virtual speakers" or "based on virtual speaker distribution" does not necessarily mean that the virtual space is used as an input to generate the audio signals. Instead, such reference merely indicates that the distribution associated with the virtual speakers may be used as a basis for generating the audio signals. For example, the speaker locations that may be used to indicate the virtual speaker distribution may also be used to generate the audio signals. Given that the virtual speaker distribution may correspond to the speaker locations, the audio signals that may be generated using the speaker locations may be considered as also being based on the virtual speaker distribution.

At block 708, each respective virtual speaker may be mapped to a respective point source in an audio localization environment that corresponds to the virtual space. In some embodiments, the virtual speaker/point source mapping may be performed such as described above with respect to FIG. 6. In these or other embodiments, the mapping may include providing point source data to an audio localization system such as described above with respect to FIG. 6.

At block 710, the audio signals may be provided to the audio localization system according to the mapping of the virtual speakers to their respective point sources. For example, in some embodiments, the audio signals may be provided to the audio localization system by an integration system, such as described above with respect to FIG. 6. In these or other embodiments, listener pose data may also be provided to the audio localization system, such as also described above with respect to FIG. 6.

As indicated above with respect to FIG. 6, in some embodiments, the audio localization system may include a localization controller (e.g., the localization controller 656 of FIG. 6) configured to synthesize a binaural sound for playback by a set of stereo speakers. The audio localization system (e.g., via its corresponding localization controller) may accordingly be configured to synthesize the binaural sound based on the received audio signals corresponding to respective point sources according to the mapping. In these or other embodiments, the audio localization system may also synthesize the binaural sound based on the listener pose data such as also described above with respect to FIG. 6. The synthesizing of the binaural sound may be such that the audio of the audio signals is simulated as being presented by speakers within the physical environment that are represented by the virtual speakers of the virtual space.

Modifications, additions, or omissions may be made to the method 700 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments.

Terms used herein and especially in the appended claims (e.g., bodies of the appended claims) are generally intended as "open" terms (e.g., the term "including" may be interpreted as "including, but not limited to," the term "having" may be interpreted as "having at least," the term "includes" may be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases may not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" may be interpreted to mean "at least one" or "one or more"); the same holds true for the use of definite articles used to introduce claim recitations.

In addition, even if a specific number of an introduced claim recitation is explicitly recited, those skilled in the art will recognize that such recitation may be interpreted to mean at least the recited number (e.g., the bare recitation of "two recitations," without other modifiers, means at least two recitations, or two or more recitations). Further, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, may be understood to contemplate the possibilities of including one of the terms, either of the terms, or both terms. For example, the phrase "A or B" may be understood to include the possibilities of "A" or "B" or "A and B."

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it may be understood that the various changes, substitutions, and alterations may be made hereto without departing from the spirit and scope of the present disclosure.

What is claimed is:

1. A method comprising:

obtaining a virtual space that includes a virtual speaker distribution of a plurality of virtual speakers within the virtual space, the virtual space representing a physical environment;

obtaining an audio file that includes audio corresponding to an audio object of an audio scene;

generating one or more audio signals based on the virtual speaker distribution and the audio file, the generating being such that presentation of the one or more audio signals by speakers within the physical environment represented by the virtual speakers produces the audio in a manner that simulates the audio object in the physical environment;

mapping each respective virtual speaker location to a respective point source location in an audio localization environment that corresponds to the virtual space, the mapping including providing point source data to an audio localization system such that a distribution of point sources in the audio localization environment matches the virtual speaker distribution within the virtual space; and providing the one or more audio signals to the audio localization system according to the mapping of the virtual speakers to their respective point sources, the audio localization system being configured to, based on the one or more audio signals corresponding to respective point sources according to the mapping, synthesize a binaural sound for playback by a set of stereo speakers such that the audio is simulated as being presented by speakers within the physical environment that are represented by the virtual speakers, the providing the one or more audio signals according to the mapping including providing a particular audio signal to a particular point source based on the particular audio signal being designated for a particular virtual speaker that is mapped to the particular point source.

2. The method of claim 1, wherein the audio representing the audio object moves along a path in the virtual space.

3. The method of claim 2, wherein the audio representing the audio object repeatedly moves along the path in the virtual space.

4. The method of claim 1, further comprising providing listener pose data to the audio localization system, the listener pose data indicating one or more of a location or an orientation within the virtual space of a person, wherein the audio localization system is configured to synthesize the binaural sound based on the listener pose data such that the audio is simulated as being perceived by such a person at the location.

5. The method of claim 1, wherein the audio localization system includes a head-related transfer function (HRTF) system.

6. The method of claim 1, wherein the point source data includes positional data and orientation data.

7. The method of claim 1, wherein the one or more audio signals are provided to the audio localization system via an integration system.

8. A system comprising:

one or more processors; and one or more non-transitory computer-readable storage media including instructions, that, in response to being executed by the one or more processors, cause the system to perform operations, the operations comprising:

obtaining a virtual space that includes a virtual speaker distribution of a plurality of virtual speakers within the virtual space, the virtual space representing a physical environment;

obtaining an audio file that includes audio corresponding to an audio object of an audio scene;

generating one or more audio signals based on the virtual speaker distribution and the audio file, the generating being such that presentation of the one or more audio signals by speakers within the physical environment represented by the virtual speakers produces the audio in a manner that simulates the audio object in the physical environment;

mapping each respective virtual speaker to a respective point source in an audio localization environment that corresponds to the virtual space; and providing the one or more audio signals to an audio localization system according to the mapping of the virtual speakers to their respective point sources, the audio localization system being configured to, based on the one or more audio signals corresponding to respective point sources according to the mapping, synthesize a binaural sound for playback by a set of stereo speakers such that the audio is simulated as being presented by speakers within the physical environment that are represented by the virtual speakers, the providing the one or more audio signals according to the mapping including providing a particular audio signal to a particular point source based on the particular audio signal being designated for a particular virtual speaker that is mapped to the particular point source.

9. The system of claim 8, wherein the audio representing the audio object moves along a path in the virtual space.

10. The system of claim 9, wherein the audio representing the audio object repeatedly moves along the path in the virtual space.

11. The system of claim 8, wherein the operations further comprise providing listener pose data to the audio localization system, the listener pose data indicating one or more of a location or an orientation within the virtual space of a person, wherein the audio localization system is configured to synthesize the binaural sound based on the listener pose data such that the audio is simulated as being perceived by such a person at the location.

12. The system of claim 8, wherein the audio localization system includes a head-related transfer function (HRTF) system.

13. The system of claim 8, wherein mapping each respective virtual speaker to a respective point source includes providing point source data to the audio localization system, the point source data indicating a distribution of point sources that corresponds to the virtual speaker distribution.

14. The system of claim 8, wherein the one or more audio signals are provided to the audio localization system via an integration system.

15. One or more non-transitory computer-readable storage media including instructions, that, in response to being executed by one or more processors, cause a system to perform operations, the operations comprising:

obtaining a virtual space that includes a virtual speaker distribution of a plurality of virtual speakers within the virtual space, the virtual space representing a physical environment;

obtaining an audio file that includes audio corresponding to an audio object of an audio scene;

generating one or more audio signals based on the virtual speaker distribution and the audio file, the generating being such that presentation of the one or more audio signals by speakers within the physical environment represented by the virtual speakers produces the audio in a manner that simulates the audio object in the physical environment;

mapping each respective virtual speaker location to a respective point source location in an audio localization environment that corresponds to the virtual space, the mapping including providing point source data to an audio localization system such that a distribution of point sources in the audio localization environment matches the virtual speaker distribution within the virtual space; and providing the one or more audio signals to the audio localization system according to the mapping of the virtual speakers to their respective point sources, the audio localization system being configured to, based on the one or more audio signals corresponding to respective point sources according to the mapping, synthesize a binaural sound for playback by a set of stereo speakers such that the audio is simulated as being presented by speakers within the physical environment that are represented by the virtual speakers.

16. The one or more non-transitory computer-readable storage media of claim 15, wherein the audio representing the audio object moves along a path in the virtual space.

17. The one or more non-transitory computer-readable storage media of claim 15, wherein the operations further comprise providing listener pose data to the audio localization system, the listener pose data indicating one or more of a location or an orientation within the virtual space of a person, wherein the audio localization system is configured to synthesize the binaural sound based on the listener pose data such that the audio is simulated as being perceived by such a person at the location.

18. The one or more non-transitory computer-readable storage media of claim 15, wherein providing the one or more audio signals according to the mapping includes providing a particular audio signal to a particular point source based on the particular audio signal being designated for a particular virtual speaker that is mapped to the particular point source.

19. The one or more non-transitory computer-readable storage media of claim 15, wherein the audio localization system includes a head-related transfer function (HRTF) system.

20. The one or more non-transitory computer-readable storage media of claim 15, wherein the point source data includes positional data and orientation data.

* * * * *